United States Patent [19]

Hashimoto et al.

[11] 4,314,015
[45] Feb. 2, 1982

[54] ELECTROPHOTOGRAPHIC SENSITIVE MATERIALS CONTAINING DISAZO COMPOUNDS

[75] Inventors: Mitsuru Hashimoto, Hino; Kiyoshi Sakai, Tokyo; Masafumi Ohta; Akio Kozima, both of Yokohama; Masaomi Sasaki, Kawasaki; Kyoji Tsutsui, Tokyo, all of Japan

[73] Assignee: Ricoh Co., Ltd., Tokyo, Japan

[21] Appl. No.: 218,382

[22] Filed: Dec. 19, 1980

Related U.S. Application Data

[62] Division of Ser. No. 925,157, Jul. 17, 1978.

[30] Foreign Application Priority Data

Jul. 18, 1977 [JP] Japan .................. 52-84976
Jul. 18, 1977 [JP] Japan .................. 52-84977
Jul. 19, 1977 [JP] Japan .................. 52-86255
Jul. 22, 1977 [JP] Japan .................. 52-87351

[51] Int. Cl.$^3$ ................................. G03G 5/06
[52] U.S. Cl. ............................ 430/58; 430/73; 430/79; 430/71; 430/75; 430/76; 430/78
[58] Field of Search ............... 430/59, 58, 72, 73, 430/79, 71, 76, 78, 75

[56] References Cited

U.S. PATENT DOCUMENTS

| | | | |
|---|---|---|---|
| 3,775,105 | 11/1973 | Kukla ......................... | 430/80 |
| 3,837,851 | 9/1974 | Shattuck et al. ........... | 430/59 |
| 3,871,882 | 3/1975 | Wiedemann ................ | 430/59 |
| 3,977,870 | 8/1976 | Rochlitz ...................... | 430/59 |
| 4,018,607 | 4/1977 | Contois ....................... | 430/73 |
| 4,026,704 | 5/1977 | Rochlitz ..................... | 430/57 |
| 4,052,210 | 10/1977 | Hectors ..................... | 430/72 |

*Primary Examiner*—Richard L. Schilling
*Assistant Examiner*—John L. Goodrow
*Attorney, Agent, or Firm*—Blanchard, Flynn, Thiel, Boutell & Tanis

[57] ABSTRACT

The present invention provides electrophotographic sensitive materials having a high sensitivity as well as a high flexibility which comprise a conductive support and a photosensitive layer formed thereon, said photosensitive layer containing one disazo pigment, as an effective ingredient, which is selected from the group consisting of disazo pigments expressed by the following general formulas I, II, III, and IV, General formula I:

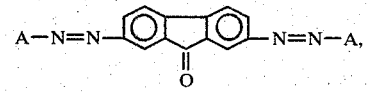

General formula II:

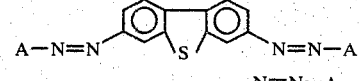

General formula III:

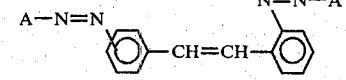

General formula IV:

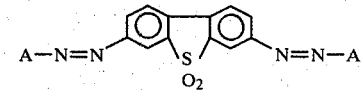

[(wherein A is selected from the group consisting of

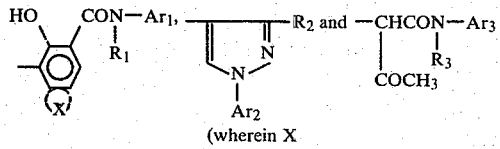

(wherein X is selected from the group consisting of aromatic rings such as benzene ring, naphthalene ring, etc., hetero rings such as indole ring, carbazole ring, benzofuran ring, etc. and their substituents, $Ar_1$ is selected from the group consisting of aromatic rings such as benzene ring, naphthalene ring, etc., hetero rings such as dibenzofuran, etc. and their substituents, $Ar_2$ and $Ar_3$ are selected from the group consisting of aromatic rings such as benzene ring, naphthalene ring, etc. and their substituents, $R_1$ and $R_3$ are selected from the group consisting of hydrogen, lower alkyl radical or phenyl radical and their substituents and $R_2$ is selected from the group consisting of lower alkyl radical, carboxyl radical and their esters)].

16 Claims, 4 Drawing Figures

ELECTROPHOTOGRAPHIC SENSITIVE MATERIALS CONTAINING DISAZO COMPOUNDS

This is a division, of application Ser. No. 925,157, filed July 17, 1978.

BACKGROUND OF THE INVENTION (a) Field of the Invention

The present invention relates to electrophotographic sensitive materials, in particular novel sensitive materials which comprise a photosensitive layer containing a disazo pigment as an effective ingredient.

(b) Description of the Prior Art

As the electrophotographic sensitive material prepared by forming a photosensitive layer containing some azo pigment as an effective ingredient on a conductive support, one prepared by employing monoazo pigment (cf. Japanese Patent Publication No. 16474/1969), one prepared by employing benzidine-type disazo pigment (cf. U.S. Pat. No. 3,898,048 and U.S. Pat. No. 4,052,210), etc. are well known. These azo pigments are admittedly useful materials as an effective ingredient of the photosensitive layer as stated above, but when various requirements for photosensitive materials are taken into account from the viewpoint of the electrophotographic process, there has in fact not yet been obtained such a material as will sufficiently meet these requirements. Therefore, it is a matter of more importance to provide a wide variety of pigments, not limited to azo pigments, so as to afford a wide range of selection of pigments acting as an effective ingredient, thereby rendering it possible to provide a photosensitive material apposite to any specific process. In other words, it is desirable for the electrophotographic process that the variety of the pigments workable as an effective ingredient of photosensitive materials is as wide as possible.

SUMMARY OF THE INVENTION

A primary object of the present invention is to provide electrophotographic sensitive materials containing novel disazo pigments workable as an effective ingredient for a variety of electrophotographic processes.

A secondary object of the present invention is to provide electrophotographic sensitive materials which afford a wide range of selection of pigments workable as an effective ingredient.

Another object of the present invention is to provide electrophotographic sensitive materials having a high sensitivity as well as high flexibility and which contain the aforesaid disazo pigment.

In other words, the present invention provides electrophotographic sensitive materials characterized by having a photosensitive layer containing a disazo pigment, as an effective ingredient, which is selected from the group consisting disazo pigments expressed by the following general formulas I, II, III, and IV, General formula I:
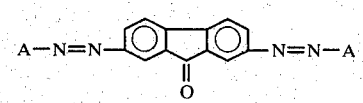

General formula II:
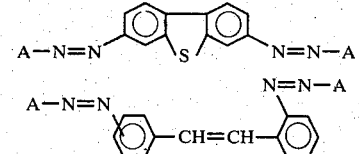

General formula III:
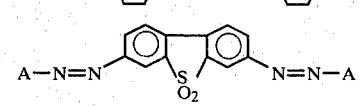
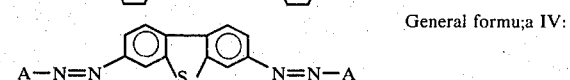

General formu;a IV:
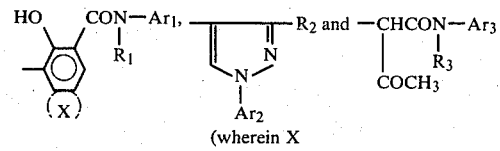

[wherein A is selected from the group consisting of $$HO \quad CON-Ar_1, \quad \underset{Ar_2}{\underset{|}{\overset{R_2 \text{ and } -CHCON-Ar_3}{\phantom{X}}}}$$

(wherein X is selected from the group consisting of aromatic rings such as benzene ring, naphthalene ring, etc., hetero rings such as indole ring, carbazole ring, benzofuran ring, etc. and their substituents, $Ar_1$ is selected from the group consisting of aromatic rings such as benzene ring, naphthalene ring, etc., hetero rings such as dibenzofuran, etc. and their substituents, $Ar_2$ and $Ar_3$ are selected from the group consisting of aromatic rings such as benzene ring, naphthalene ring, etc. and their substituents, $R_1$ and $R_3$ are selected from the group consisting of hydrogen, lower alkyl radical or phenyl radical and their substituents and $R_2$ is selected from the group consisting of lower alkyl radical, carboxyl radical and their esters)].

Hereinafter are shown concrete examples of the compounds expressed by the foregoing general formula I by means of structural formula.

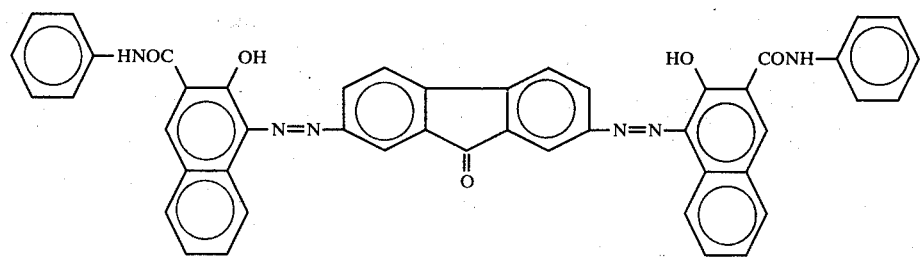

Compound No. 1A

The portion

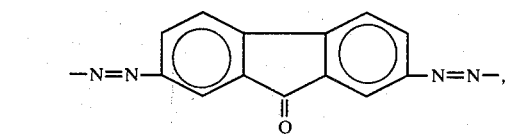

being common to Compounds No. 2A-66A, is omitted and is expressed as —$Y_1$— in short hereinafter.
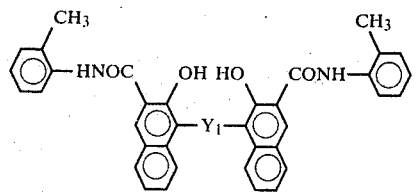 (2A)
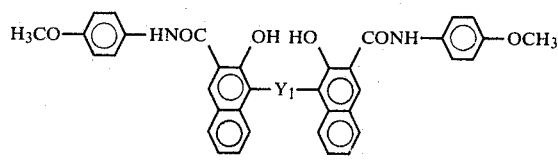 (3A)
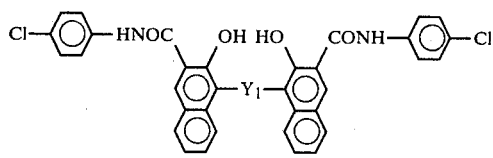 (4A)
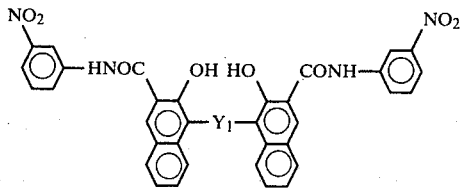 (5A)
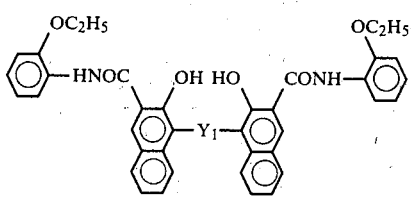 (6A)
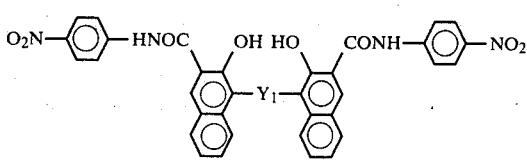 (7A)
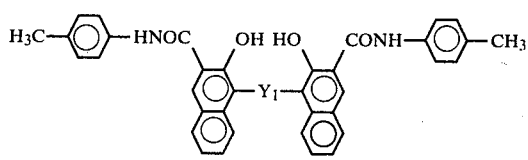 (8A)
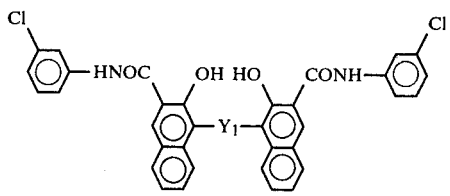 (9A)
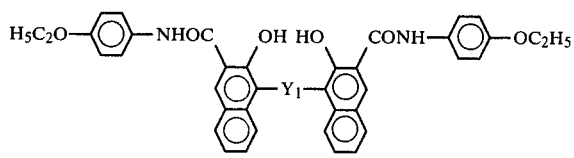 (10A)

-continued
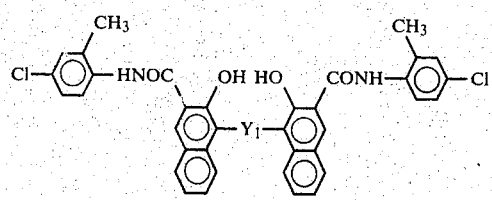 (11A)
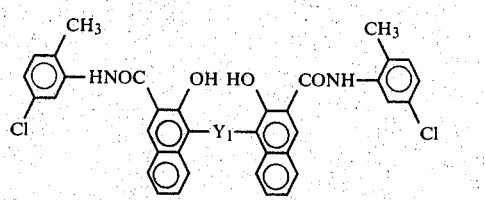 (12A)
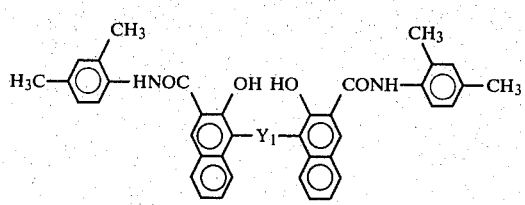 (13A)
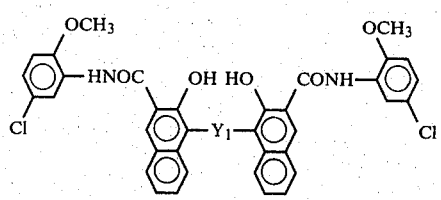 (14A)
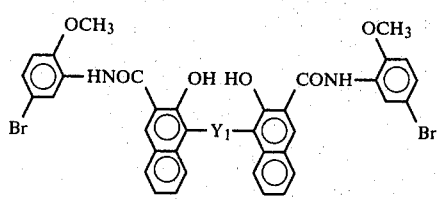 (15A)
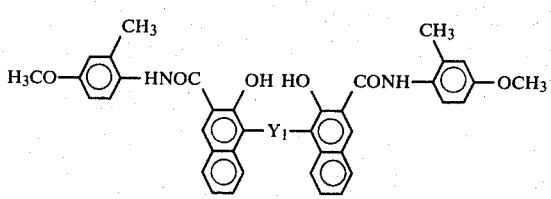 (16A)
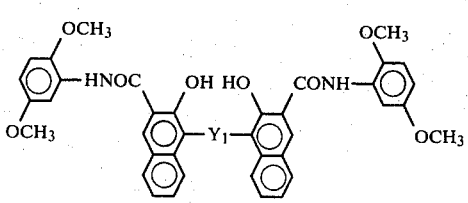 (17A)
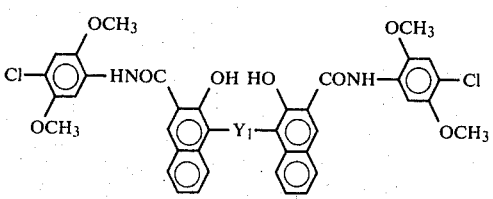 (18A)

-continued
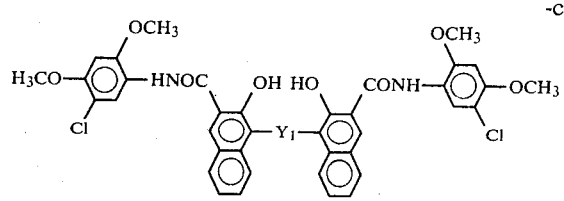 (19A)
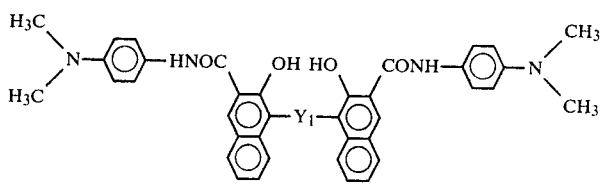 (20A)
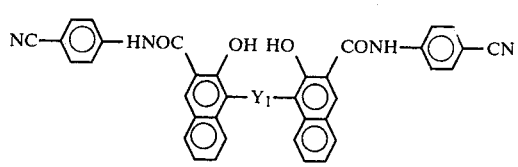 (21A)
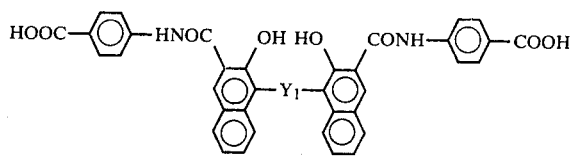 (22A)
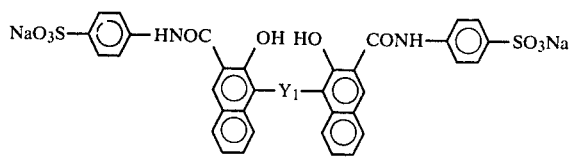 (23A)
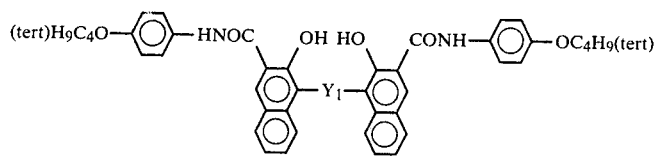 (24A)
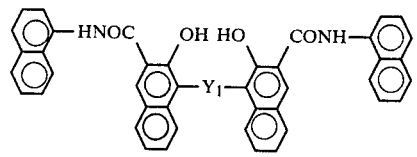 (25A)
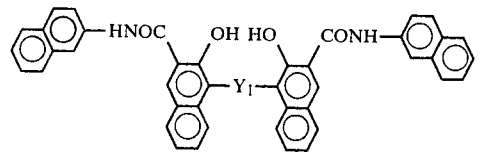 (26A)
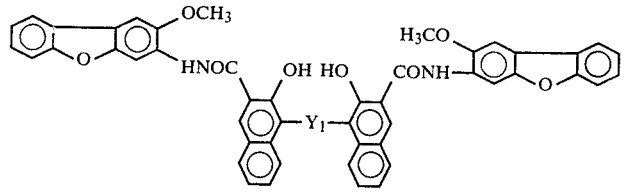 (27A)

-continued
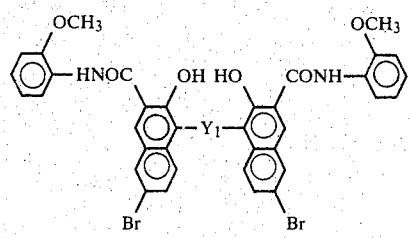 (28A)
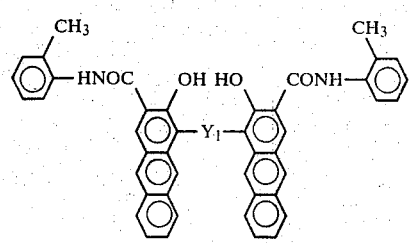 (29A)
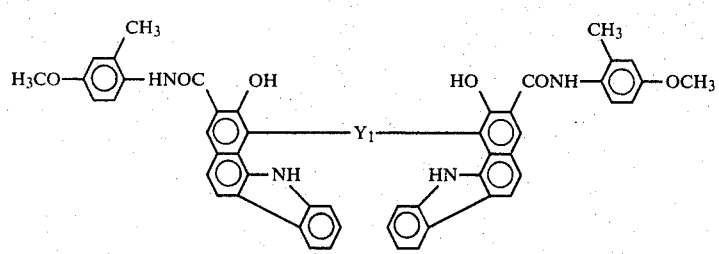 (30A)
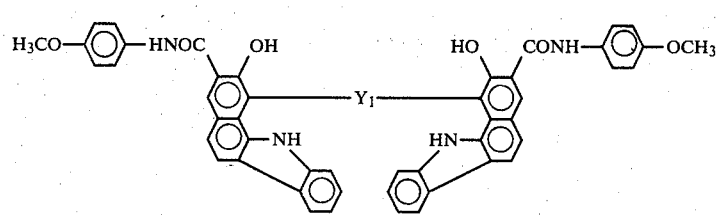 (31A)
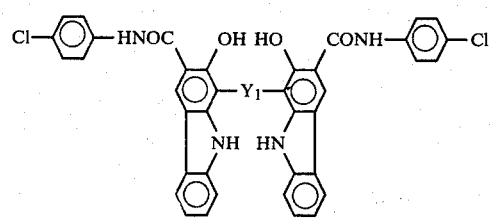 (32A)
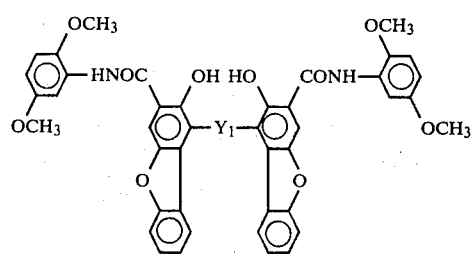 (33A)
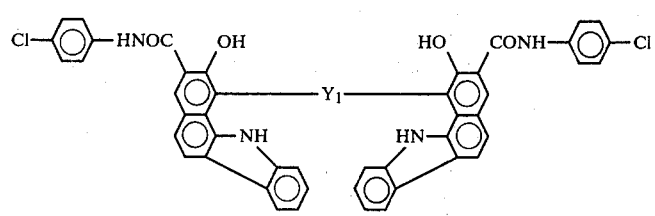 (34A)

-continued
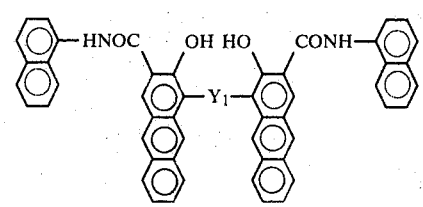 (35A)
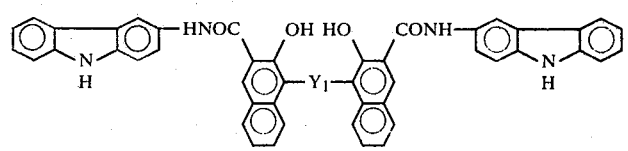 (36A)
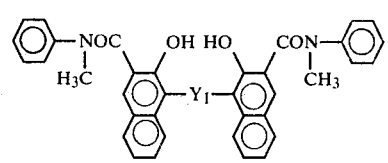 (37A)
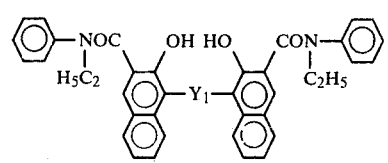 (38A)
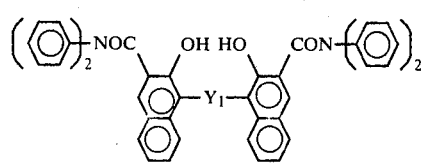 (39A)
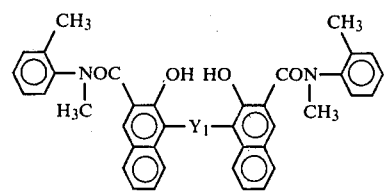 (40A)
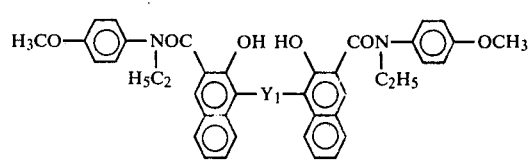 (41A)
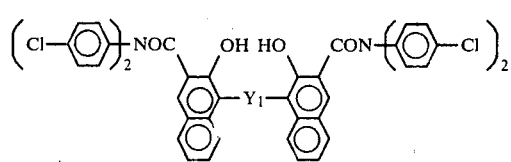 (42A)
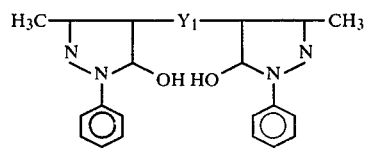 (43A)

-continued
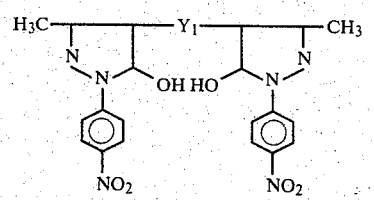 (44A)
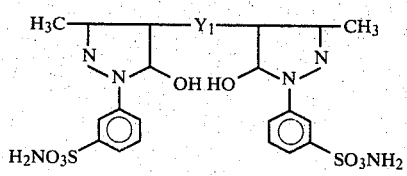 (45A)
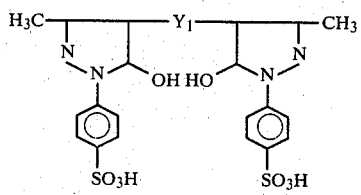 (46A)
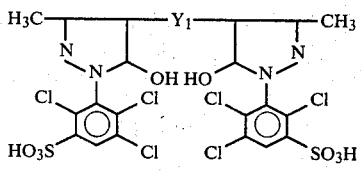 (47A)
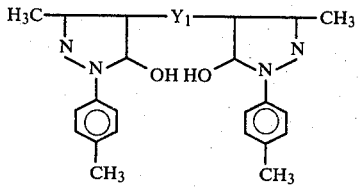 (48A)
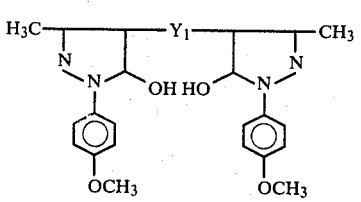 (49A)
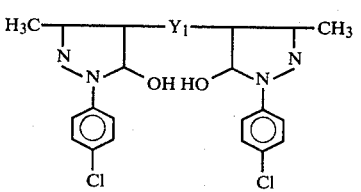 (50A)
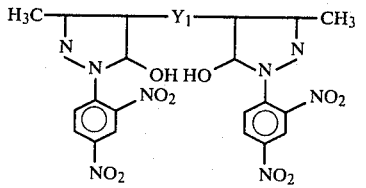 (51A)

-continued
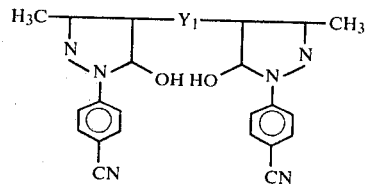 (52A)
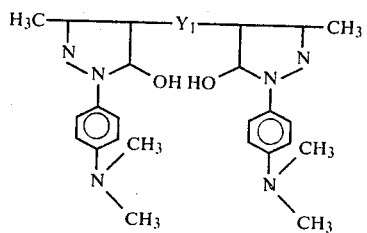 (53A)
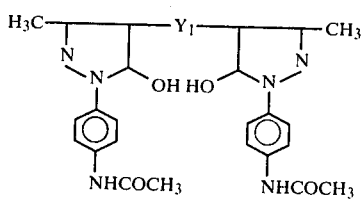 (54A)
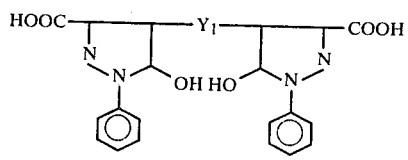 (55A)
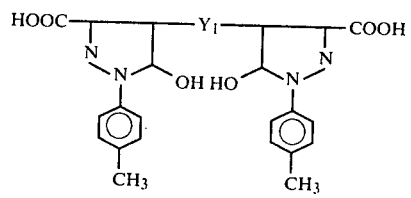 (56A)
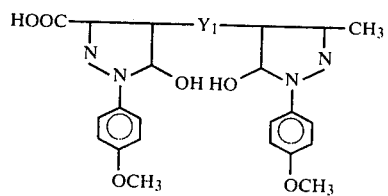 (57A)
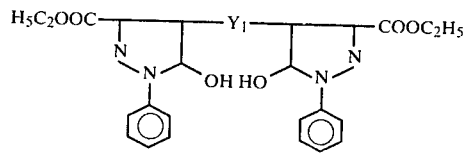 (58A)
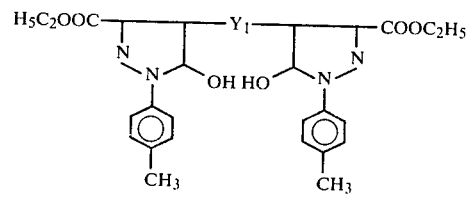 (59A)

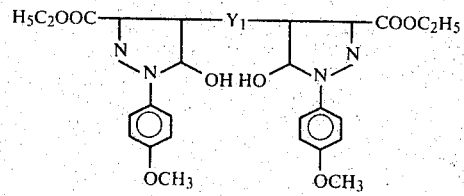 (60A)

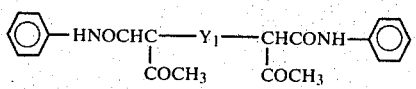 (61A)

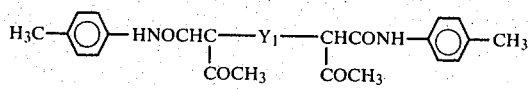 (62A)

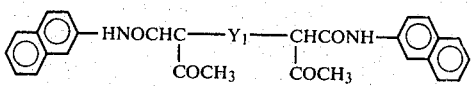 (63A)

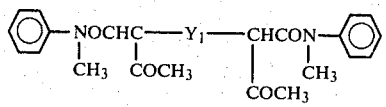 (64A)

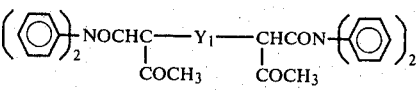 (65A)

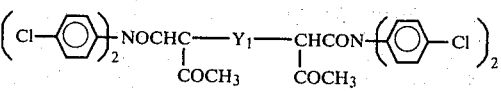 (66A)

The disazo pigments expressed by the general formula I can be easily prepared through the process comprising first diazotizing the starting material 2,7-diaminofluoren-9-one which is readily available commercially or in accordance with conventional methods to precipitate tetrazonium salt and thereafter effecting coupling reaction of this tetrazonium salt with a coupler, such as Naphthol AS, corresponding to the afore-described various pigments within an appropriate organic solvent such as N,N-dimethyl formamide in the presence of alkali. For instance, the process of preparing the pigment No. 1A is as described in the following. Further, other disazo pigments can also be prepared by applying the same process excepting for changing the material used.

Preparation Example 5.5 g of 2,7-diaminofluoren-9-one is added to a dilute hydrochloric acid consisting of 46 ml of concentrated hydrochloric acid and 46 ml of water, and same is well stirred at 60° C. for about 30 minutes. Next, this mixture is cooled to about 0° C., and a solution obtained by dissolving 3.8 g of sodium nitrite in 6 ml of water is added dropwise to said mixture at a temperature of 0°–5° C. for about 30 minutes. Then, the same is stirred at the same temperature for about 30 minutes, a small amount of unreacted matter is filtered, the filtrate is poured in 40 ml of 42% borofluoric acid, the so separated crystals are removed by filtration, washed with water and dried to obtain 7.4 g (yield 70%) of cream-colored crystals of bisdiazonium-bistetrafluoroborate. Next, the thus obtained 2 g of bisdiazonium salt and 2.9 g of 2-hydroxy-3-phenylcarbamoyl naphthalene as a coupler are dissolved in 425 ml of cooled -N,N-dimethylformamide, a solution consisting of 4.1 g of sodium acetate and 60 ml of water is added dropwise thereto at a temperature of 4°–8° C. for 1 hour, and the same is stirred at room temperature for about 3 hours. Thereafter, precipitates are removed by filtration, washed 3 times with 300 ml of water, and further washed 7 times with 300 ml of N,N-dimethylformamide. Still residual N,N-dimethylformamide is washed away with acetone, and thus obtained golden-colored crystals are dried at 70° C. under reduced pressure of 2 mmHg to obtain 3 g (the yield 80%) of disazo pigment No. 1A. The melting point is over 300° C.

| Elementary analysis (as $C_{47}H_{30}N_6O_5$) | | |
|---|---|---|
| | Calculated value | Observed value |
| C (%) | 74.39 | 74.01 |
| H (%) | 3.99 | 4.06 |
| N (%) | 11.08 | 11.39 |
| IR Absorption Spectrum (NBr tablet) | | |
| 1675 cm$^{-1}$ | (Secondary amide) | |
| 1720 cm$^{-1}$ | (Carbonyl) | |

Hereinafter will be shown concrete examples of compounds represented by the general formula II.

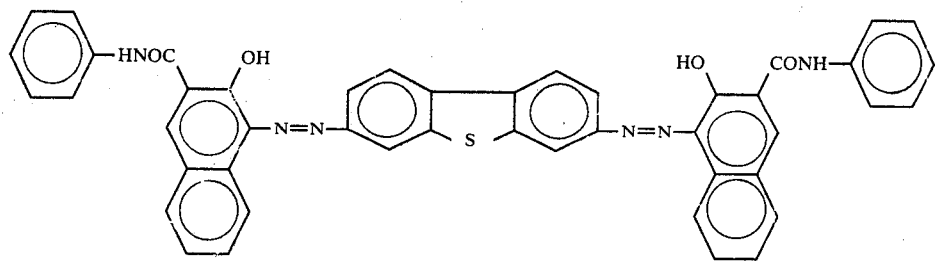
Compound No. 1B
The portion 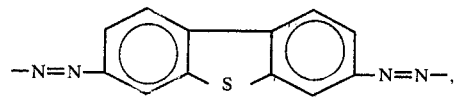 being common to Compounds No. 2B-66B, is omitted and represented as —Y$_2$— in short hereinafter.
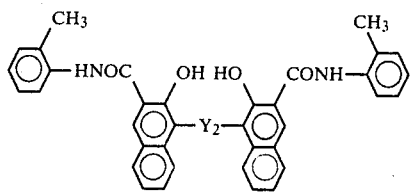 (2B)
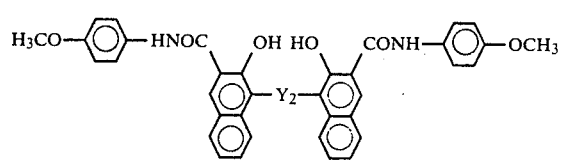 (3B)
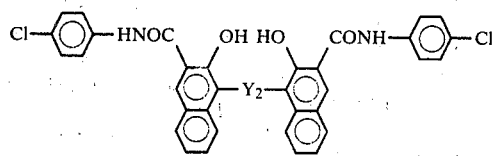 (4B)
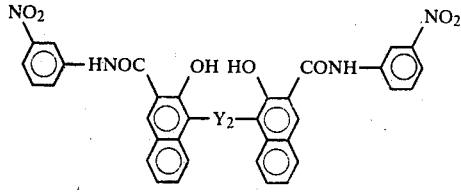 (5B)
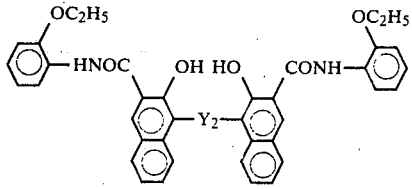 (6B)
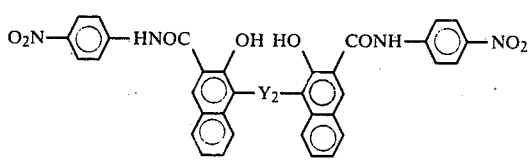 (7B)

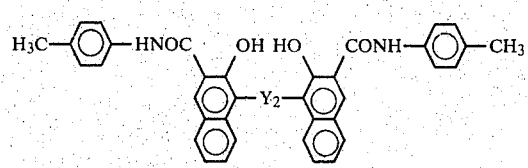 (8B)
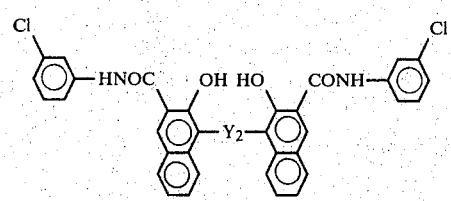 (9B)
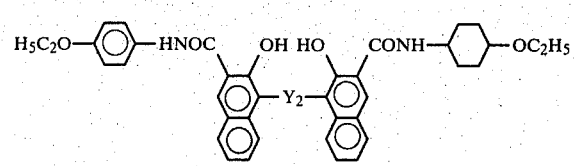 (10B)
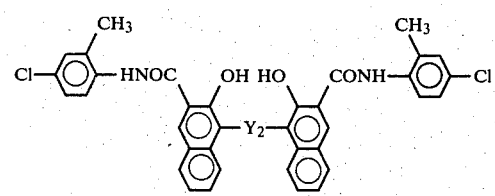 (11B)
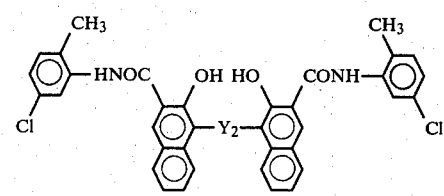 (12B)
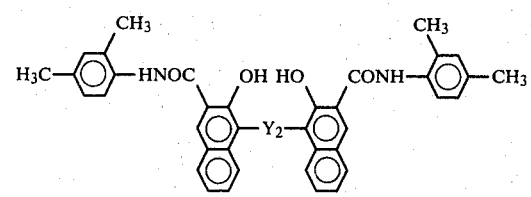 (13B)
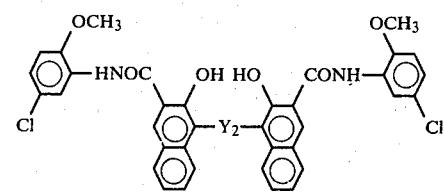 (14B)
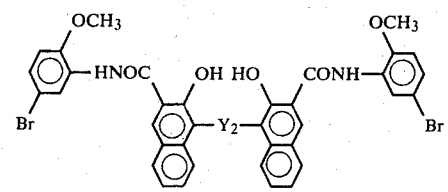 (15B)

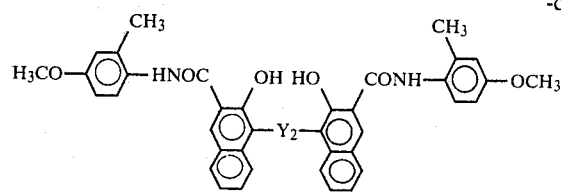
(16B)
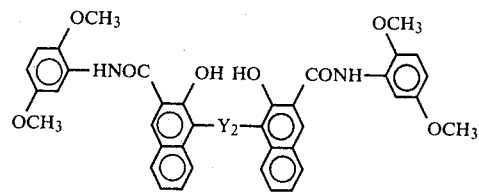
(17B)
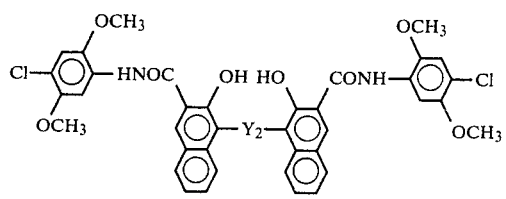
(18B)
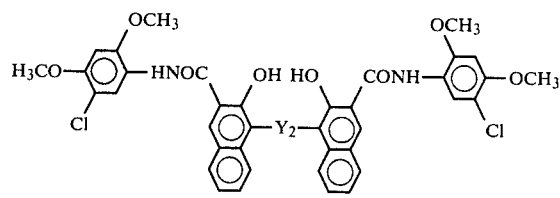
(19B)
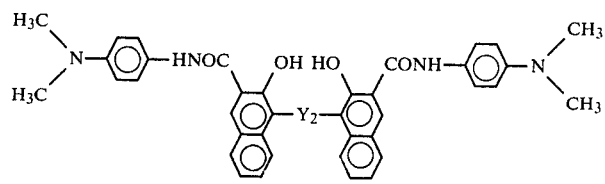
(20B)
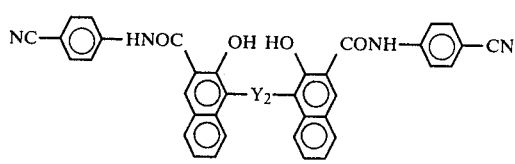
(21B)
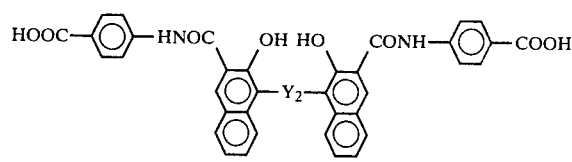
(22B)
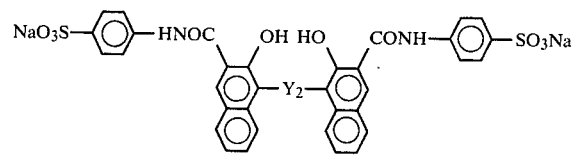
(23B)
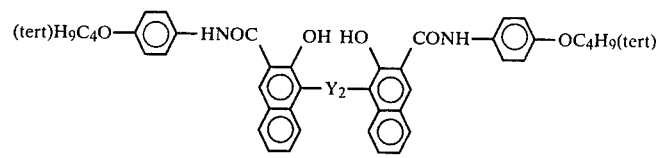
(24B)

-continued
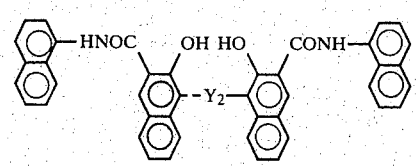 (25B)
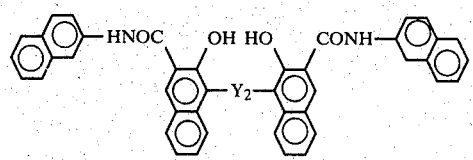 (26B)
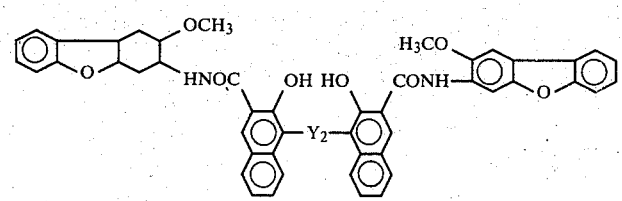 (27B)
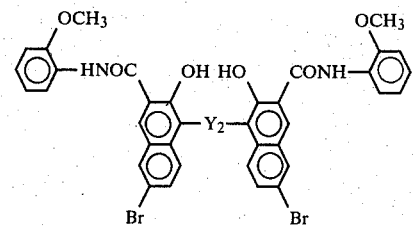 (28B)
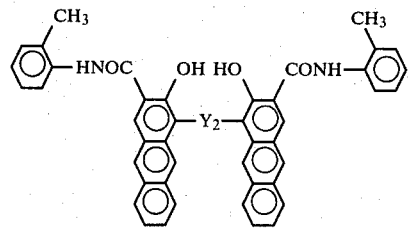 (29B)
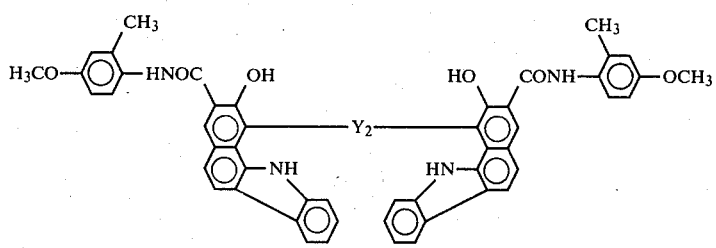 (30B)
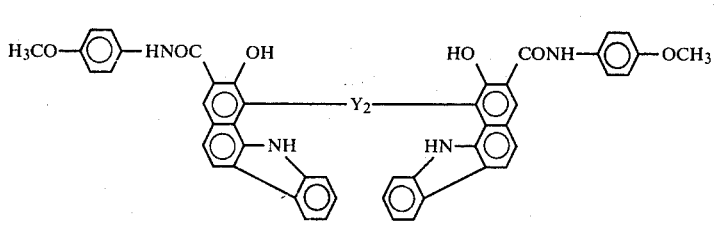 (31B)

-continued
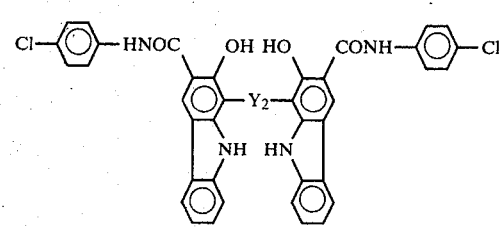
(32B)
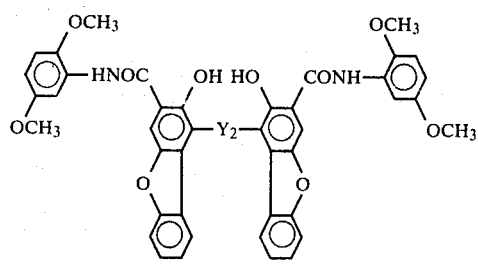
(33B)
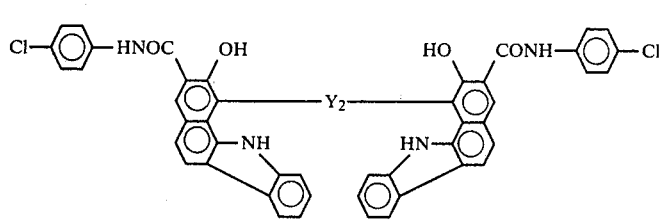
(34B)
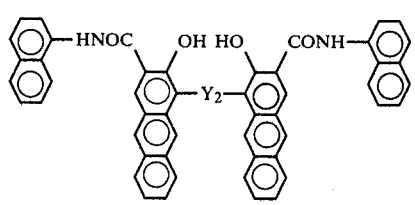
(35B)
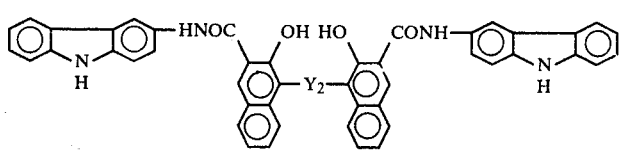
(36B)
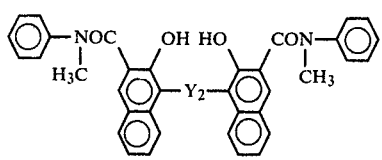
(37B)
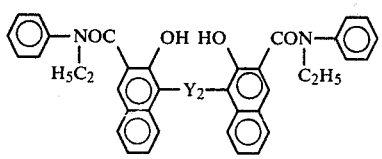
(38B)
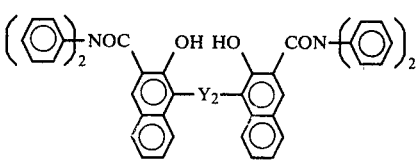
(39B)

-continued
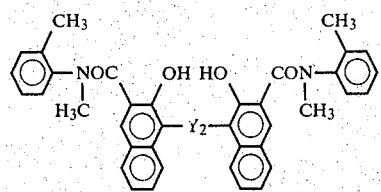 (40B)
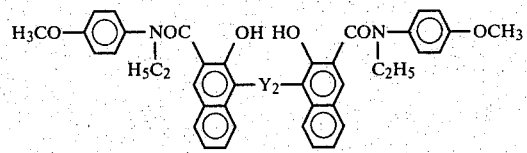 (41B)
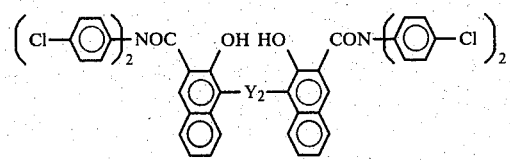 (42B)
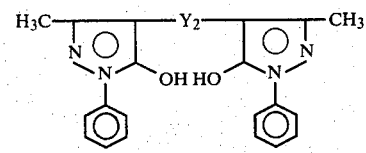 (43B)
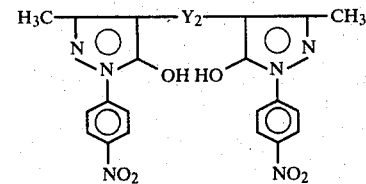 (44B)
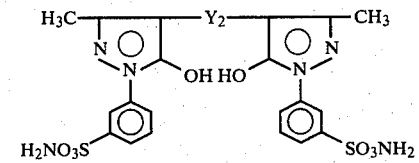 (45B)
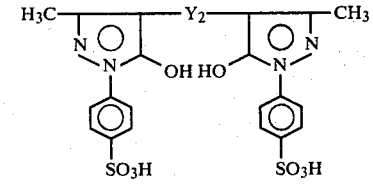 (46B)
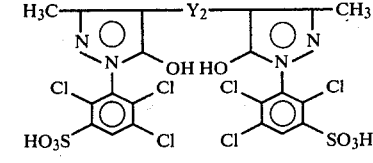 (47B)
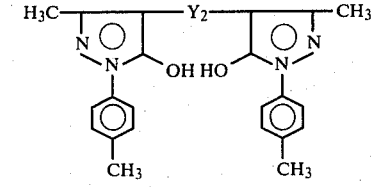 (48B)

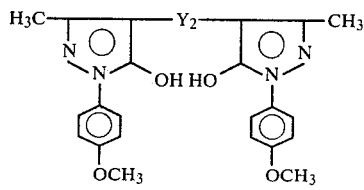 (49B)
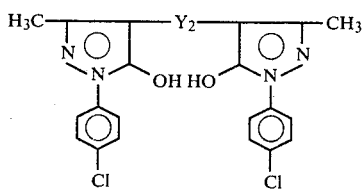 (50B)
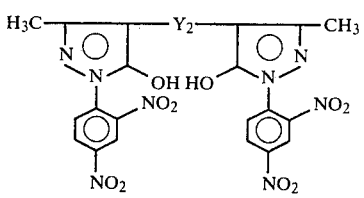 (51B)
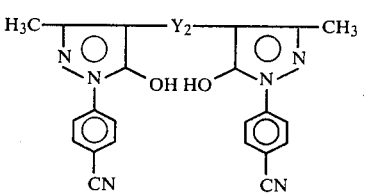 (52B)
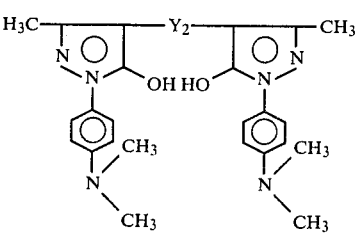 (53B)
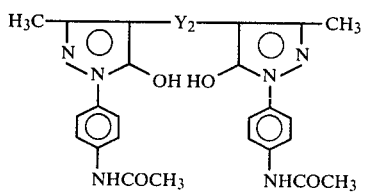 (54B)
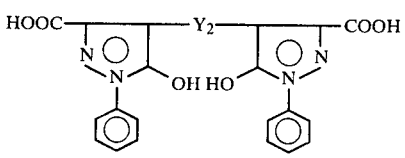 (55B)
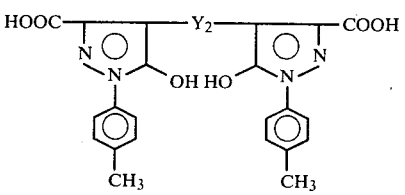 (56B)

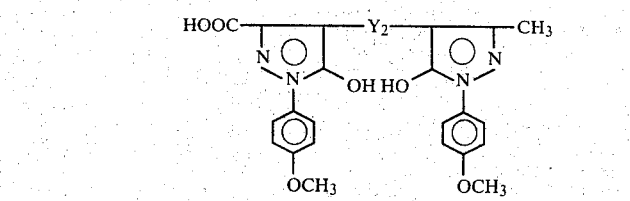 (57B)

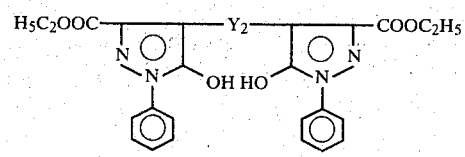 (58B)

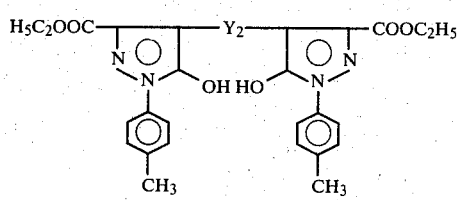 (59B)

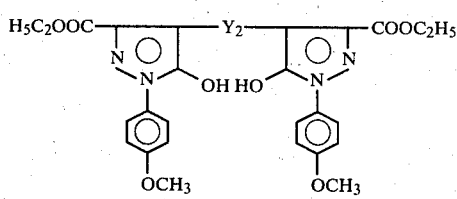 (60B)

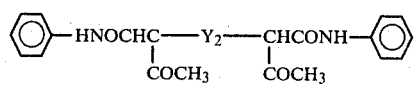 (61B)

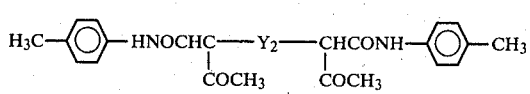 (62B)

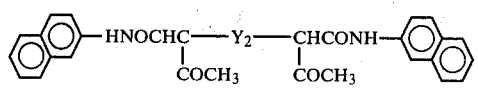 (63B)

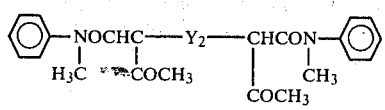 (64B)

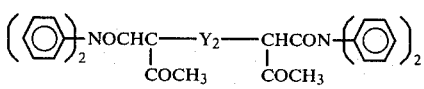 (65B)

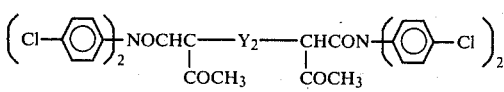 (66B)

The disazo pigments expressed by the general formula II can be easily prepared through the aforesaid process for preparing the disazo pigments expressed by the general formula I excepting the use of 3,7-diaminodibenzothiophene as the starting material. For instance, the process of preparing the pigment No. 1B is as described in the following. Further, other disazo pigments expressed by the general formula II can also be prepared in accordance with this preparation example excepting for changing the material used. Preparation Example 4.3 g of 3,7-diaminodibenzothiophene is added to a dilute hydrochloric acid consisting of 36 ml of concentrated hydrochloric acid and 36 ml of water, and same is well stirred at 60° C. for about 30 minutes. Next, this mixture is cooled to 0° C., and a solution obtained by dissolving 2.9 g of sodium nitrite in 10 ml of water is added dropwise to said mixture at a temperature of 0°–5° C. for about 30 minutes. Then, the same is stirred at the same temperature for about 30 minutes, a small amount of unreacted matter is filtrated, the filtrate is poured in 40 ml of 42% borofluoric acid, separated crystals are removed by filtration, washed with water and dried to obtain 80 g (the yield 98%) of yellow-colored crystals of bisdiazonium-distetrafluoroborate. The decomposition point is about 140° C. Next, the thus obtained 8.0 g bisdiazonium salt and 11.6 g of 2-hydroxy-3-phenylcarbamoyl naphthalene as a coupler are dissolved in 1.5 l of cooled N-N-dimethylformamide, a solution consisting of 16.4 g of sodium acetate and 160 ml of water is added dropwise thereto at a temperature of 4°–8° C. for 1 hour, and the same is stirred at room temperature for about 3 hours. Thereafter, precipitates are removed by filtration, washed 3 times with 500 ml of water, and further washed 8 times with 500 ml of N,N-dimethylformamide. Still residual N-N-dimethylformamide is washed away with acetone, and thus obtained pale and dark crystals are dried at 70° C. under reduced pressure of 2 mmHg to obtain 13.0 g (the yield 86%) of disazo pigment No. 1B. The melting point is over 300° C.

| Elementary analysis results (as $C_{46}H_{30}N_8O_4S$) | | |
|---|---|---|
| | Calculated value | Observed value |
| C (%) | 72.42 | 72.05 |
| H (%) | 3.96 | 3.79 |
| N (%) | 11.02 | 10.85 |

IR Absorption Spectrum (KBr tablet)
$1680^{-1}$ (Secondary amide)

Hereinafter will be shown concrete examples of compounds expressed by the general formula III.

Compound No. 1C

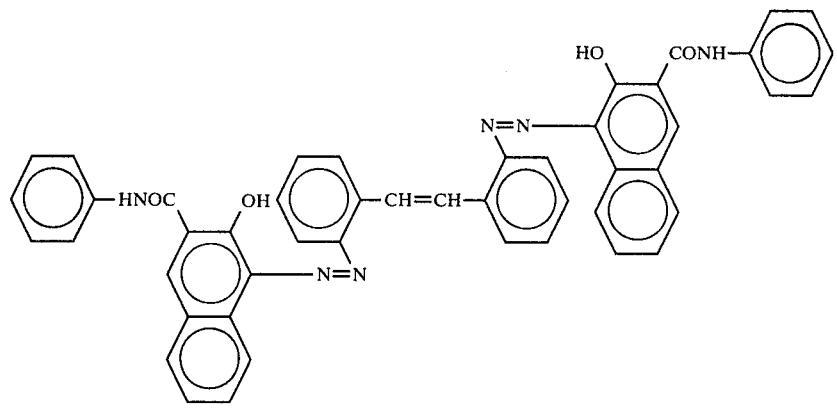

The portion

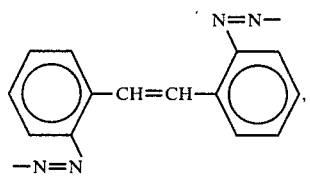

being common to Compounds No. 2C–66C, is omitted and represented as —$Y_3$— in short hereinafter.

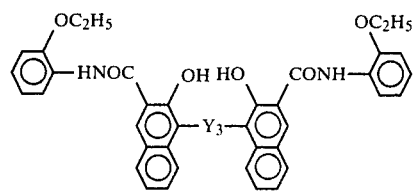  6C

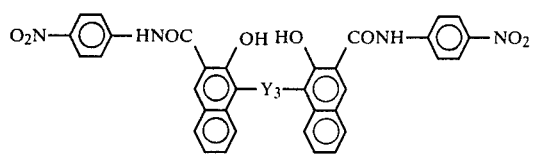  7C

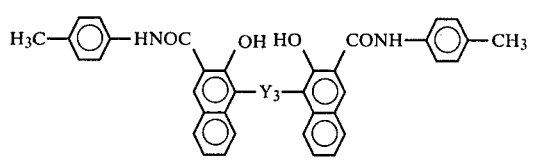  8C

-continued
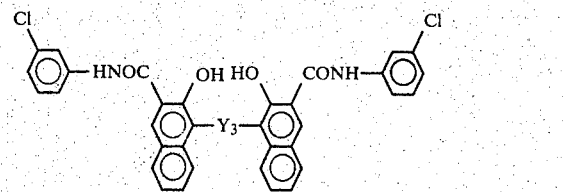
9C
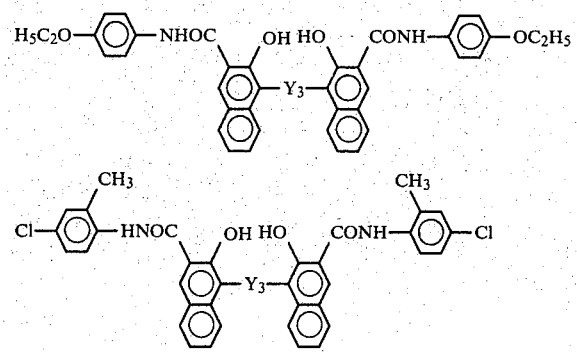
10C
11C
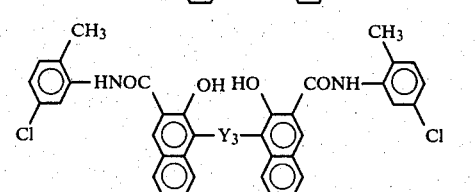
12C
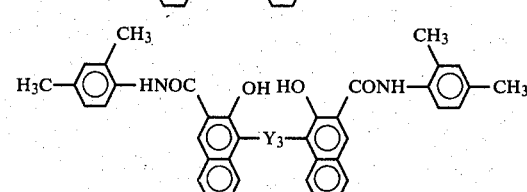
13C
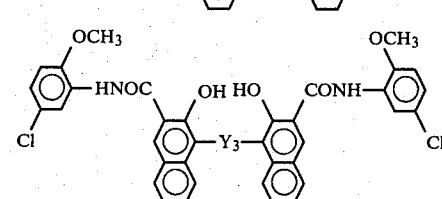
14C
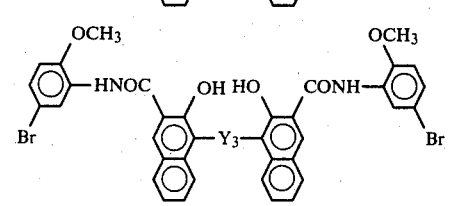
15C
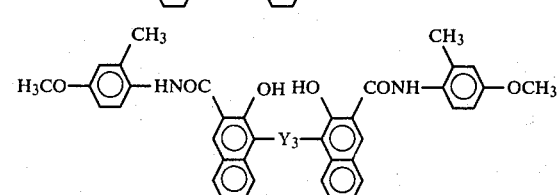
16C
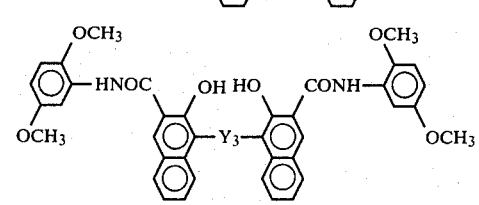
17C -continued
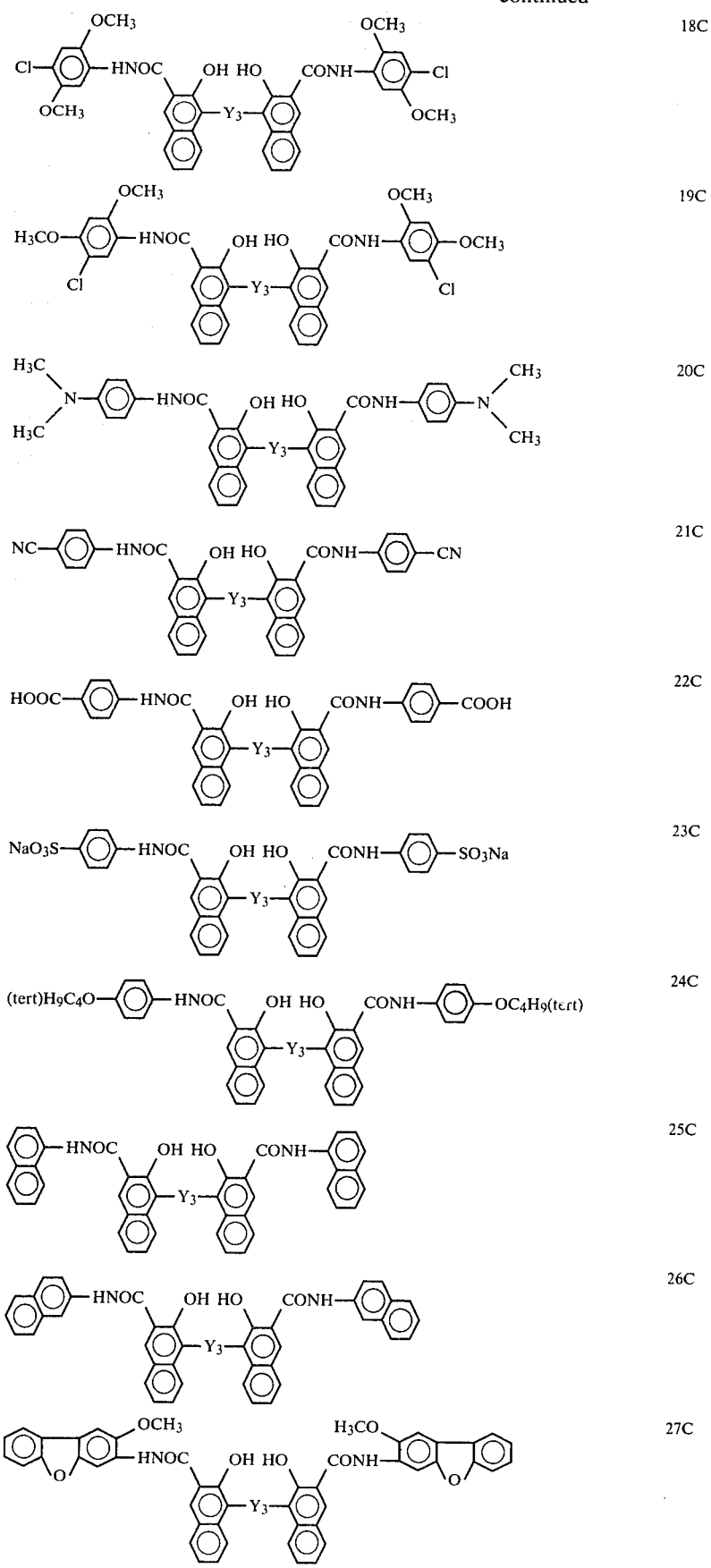

-continued
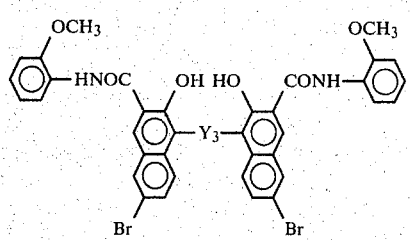 28C
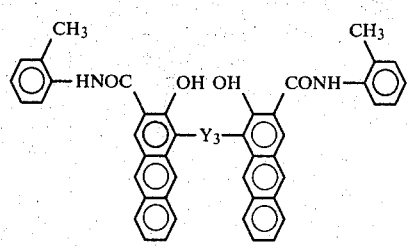 29C
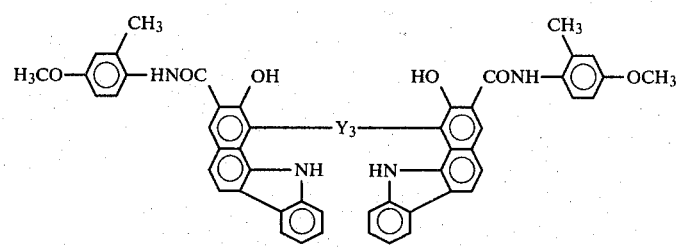 30C
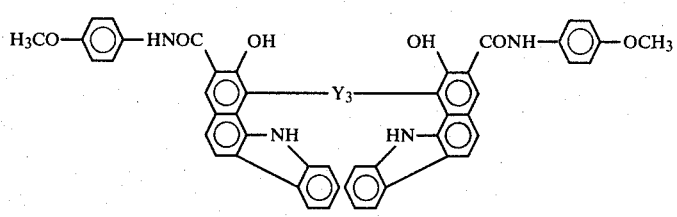 31C
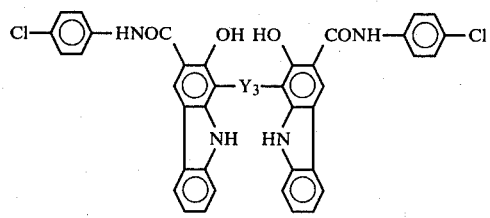 32C
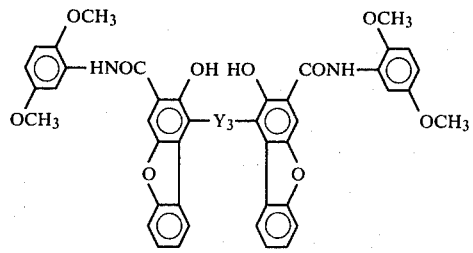 33C
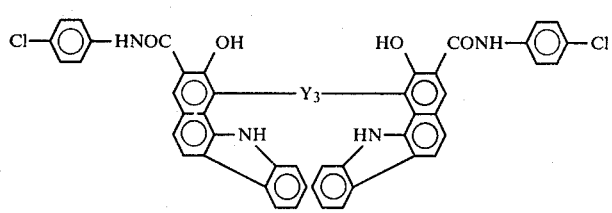 34C -continued
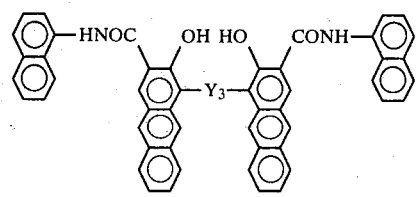
35C
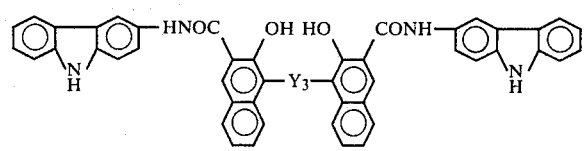
36C
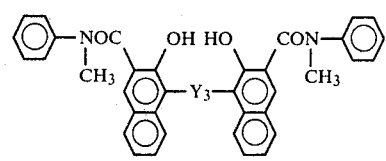
37C
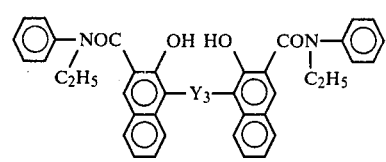
38C
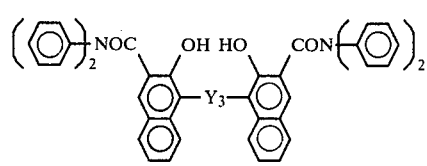
39C
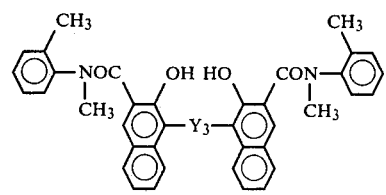
40C
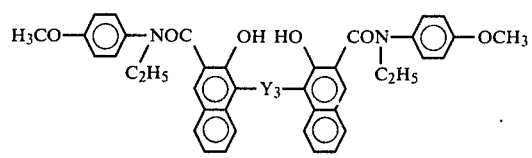
41C
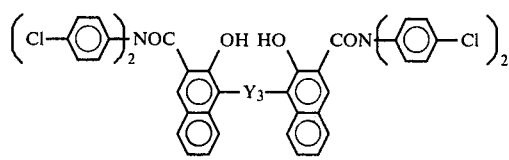
42C
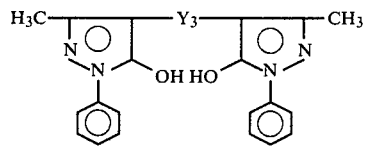
43C
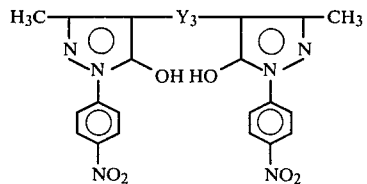
44C

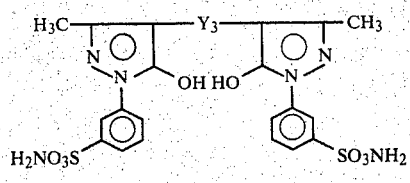
45C
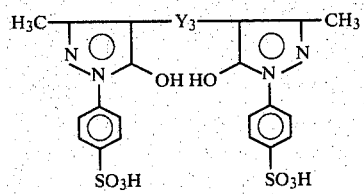
46C
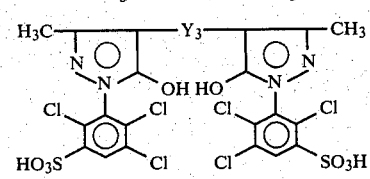
47C
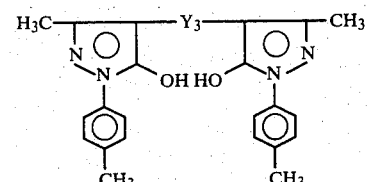
48C
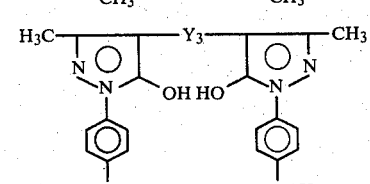
49C
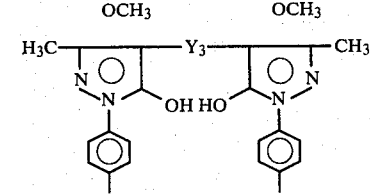
50C
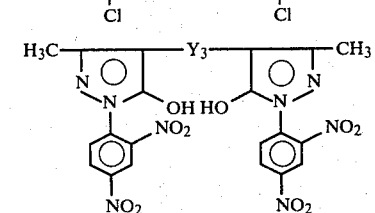
51C
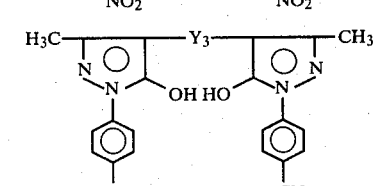
52C
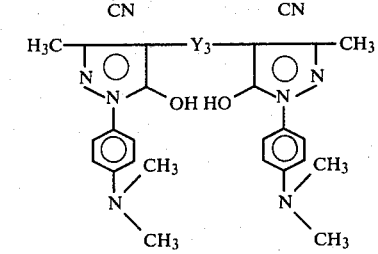
53C -continued
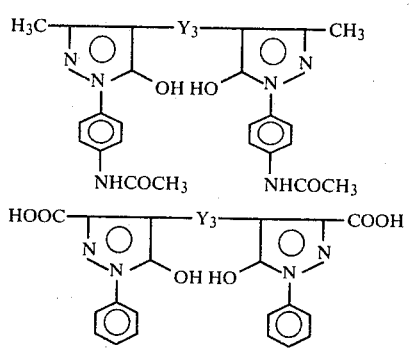 54C
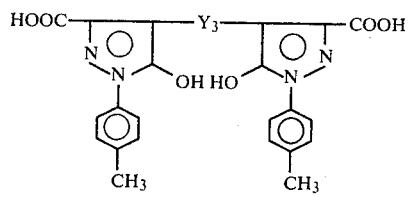 55C
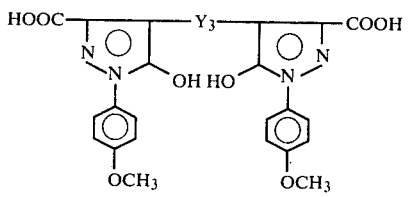 56C
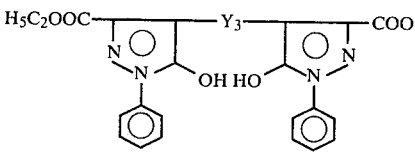 57C
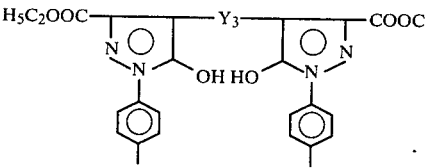 58C
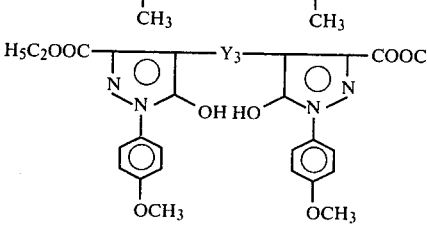 59C
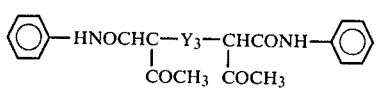 60C
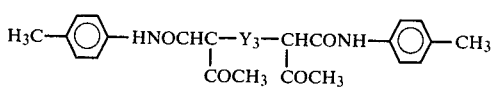 61C
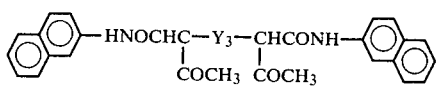 62C
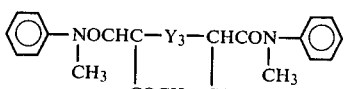 63C
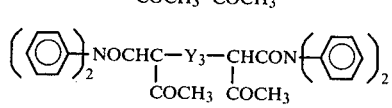 64C
65C

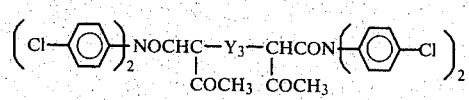
66C
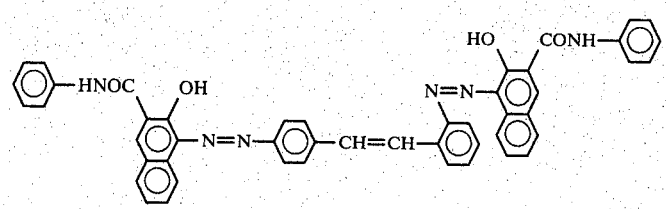
67C
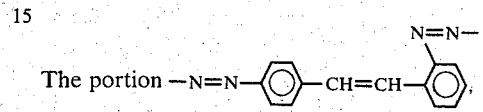
The portion being common to Compounds No. 68C–132C, is omitted and represented as —Z— in short hereinafter.
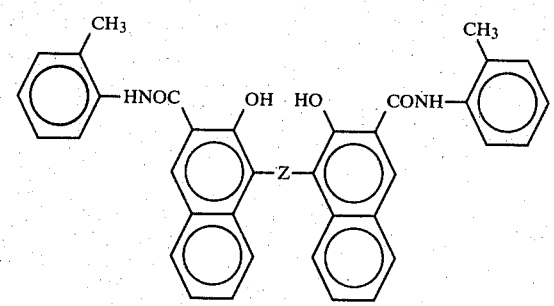
68C
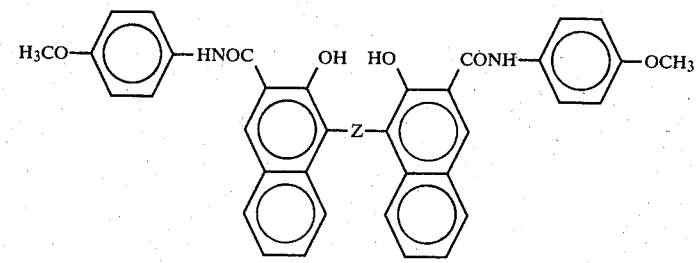
69C
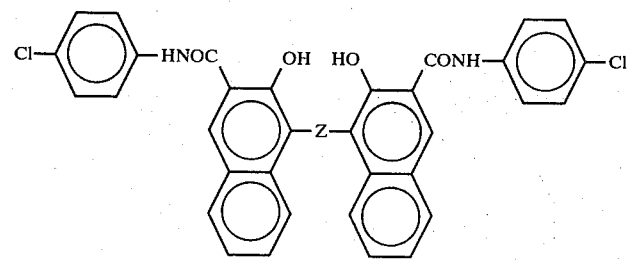
70C
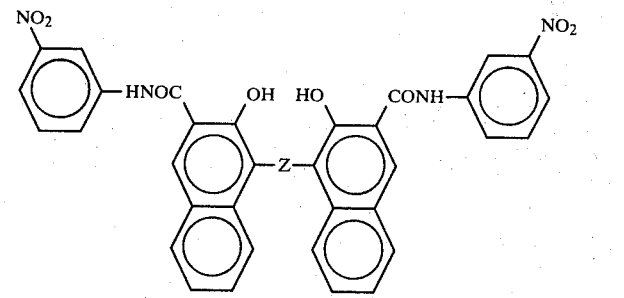
71C

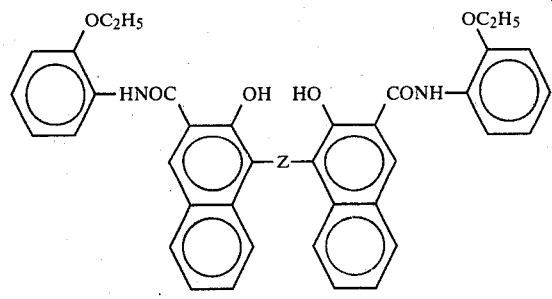
72C
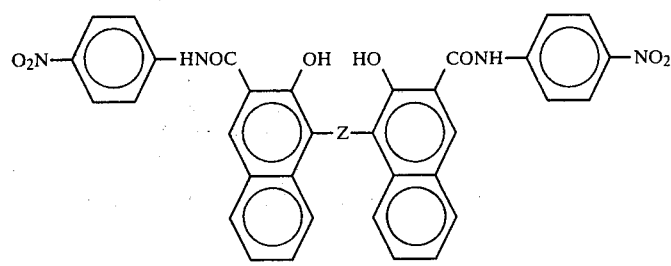
73C
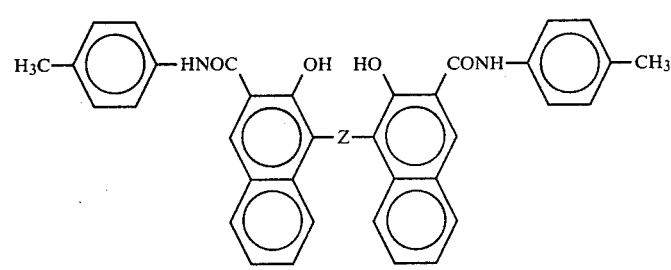
74C
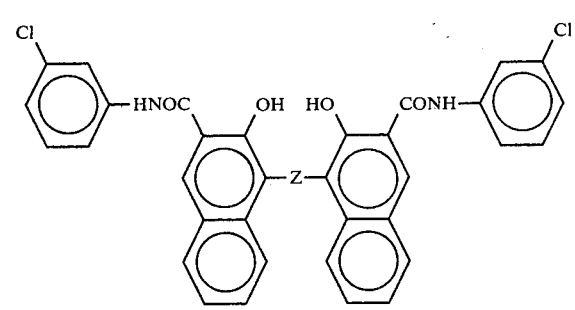
75C
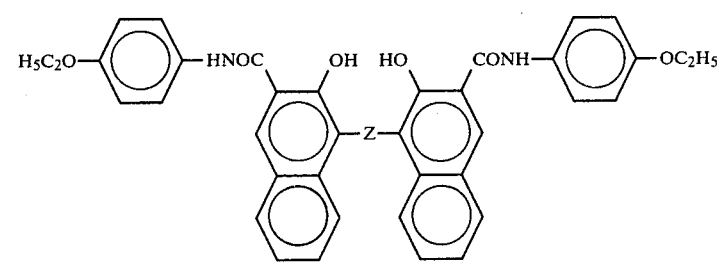
76C
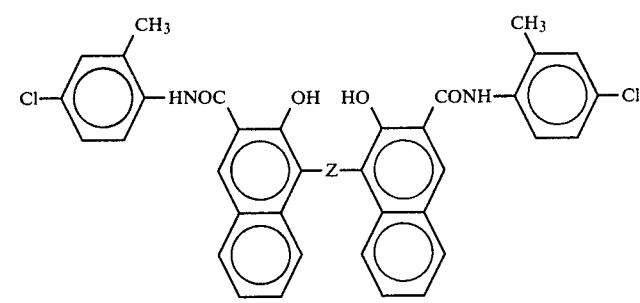
77C

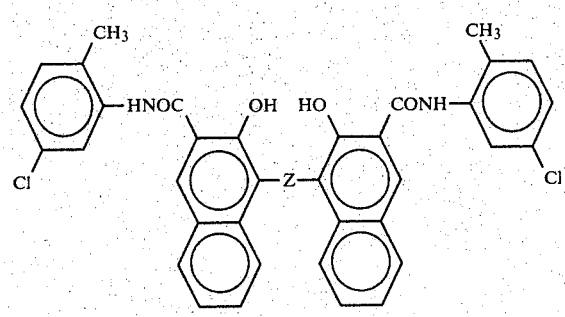
78C
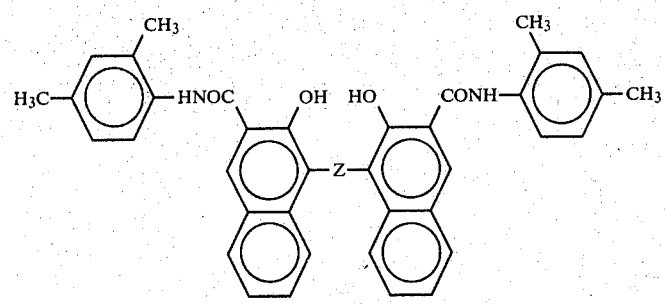
79C
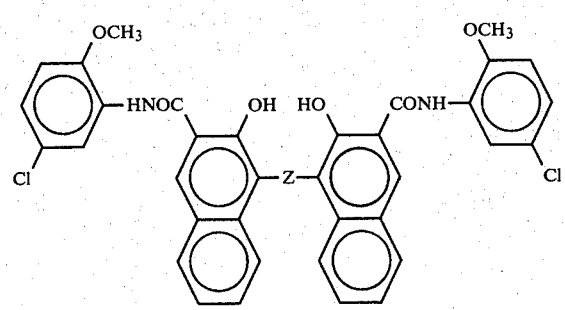
80C
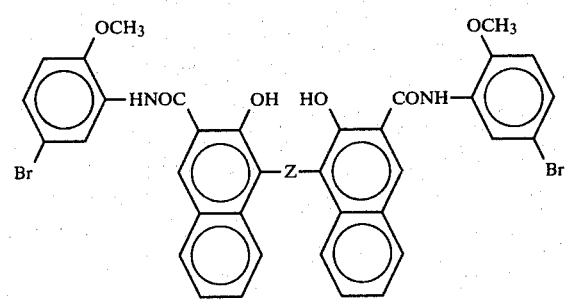
81C
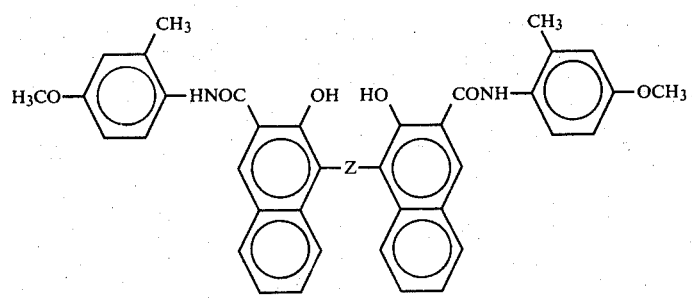
82C

-continued
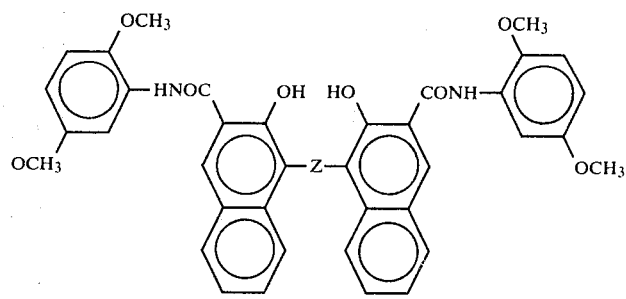 83C
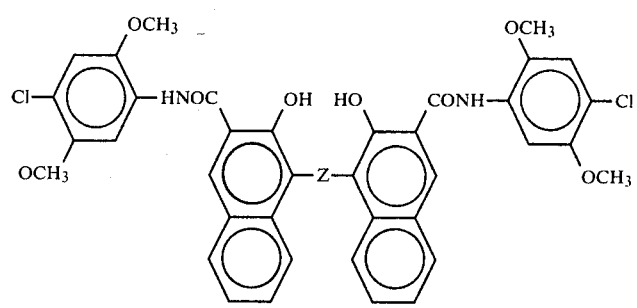 84C
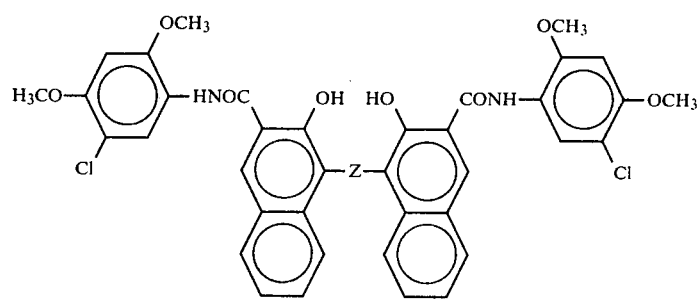 85C
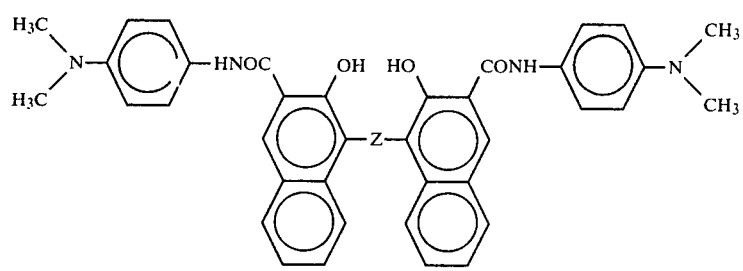 86C
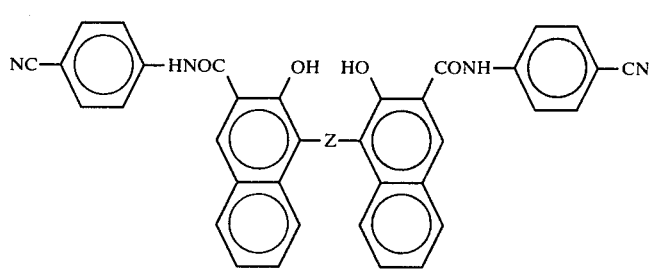 87C -continued
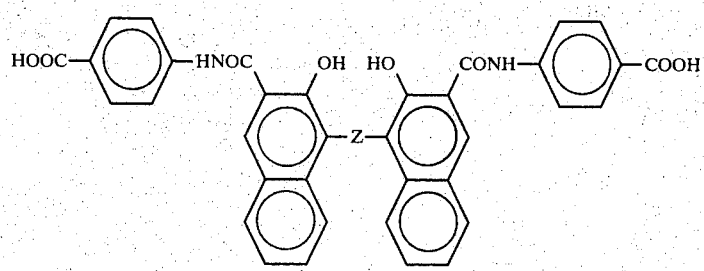
88C
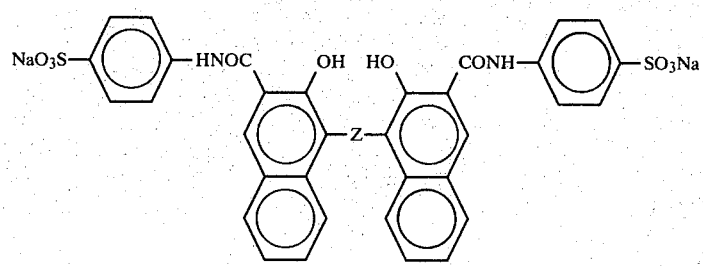
89C
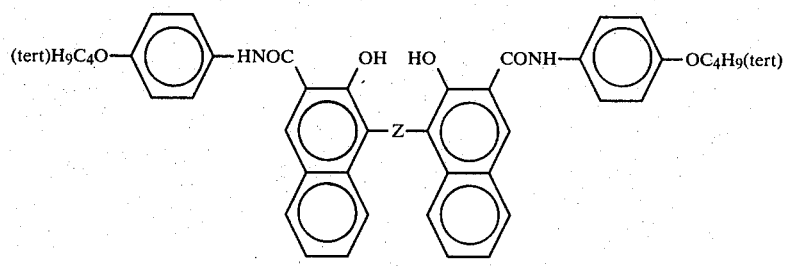
90C
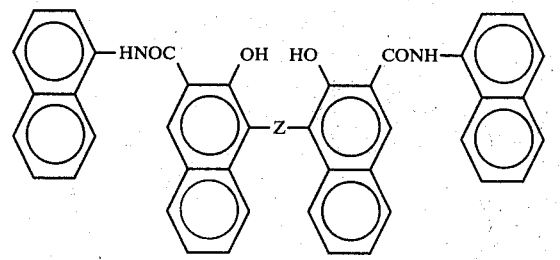
91C
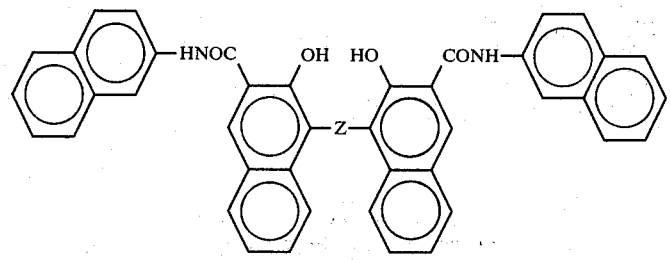
92C
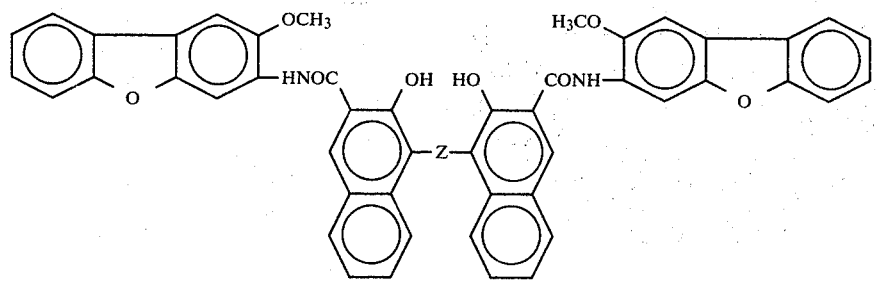
93C 94C
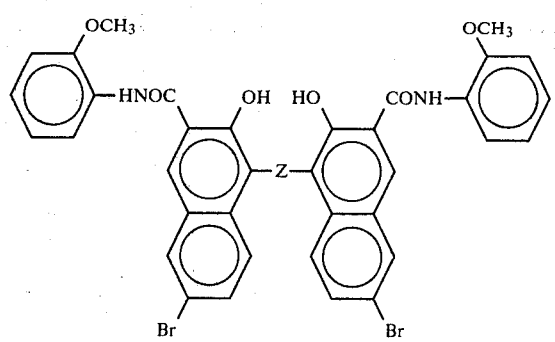
95C
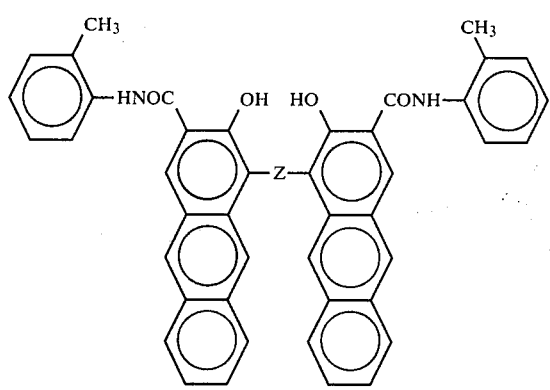
96C
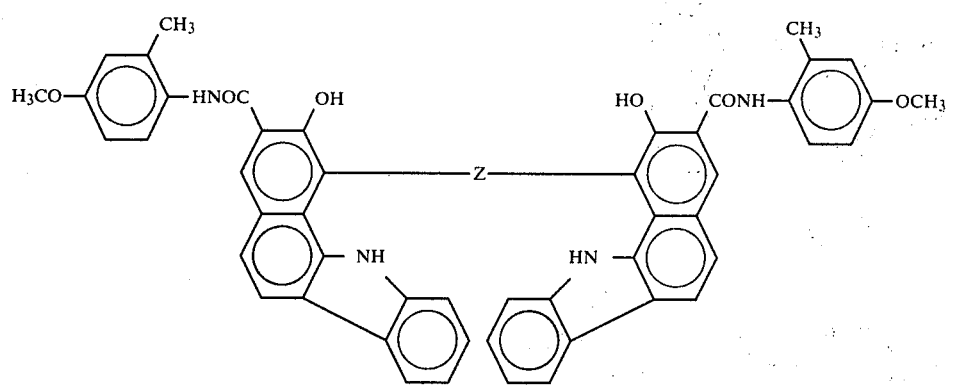
97C
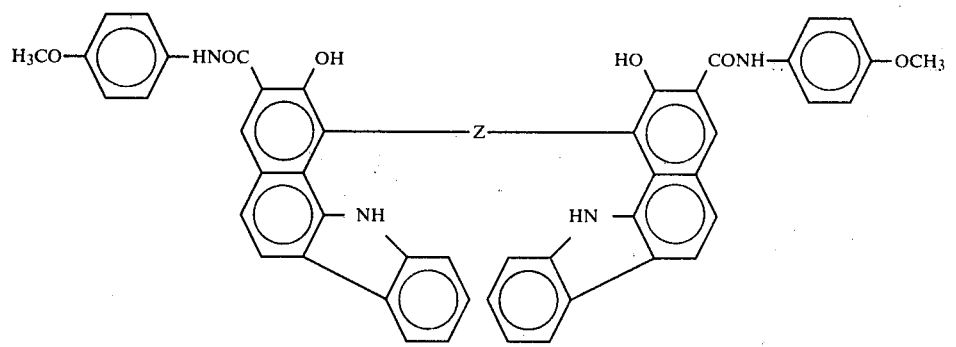

-continued
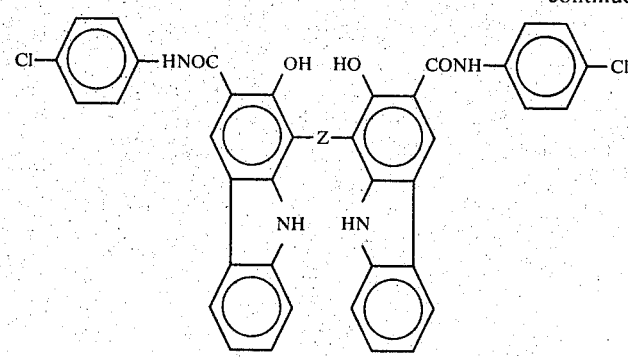
98C
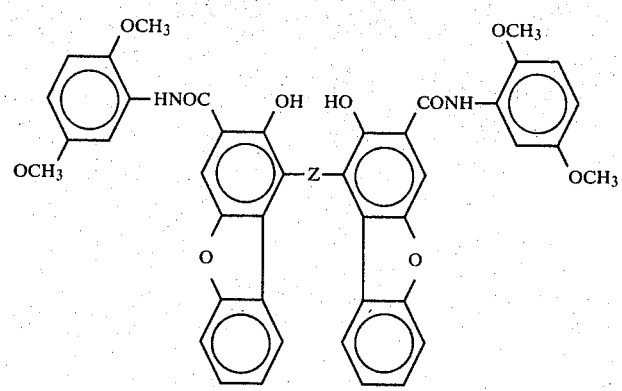
99C
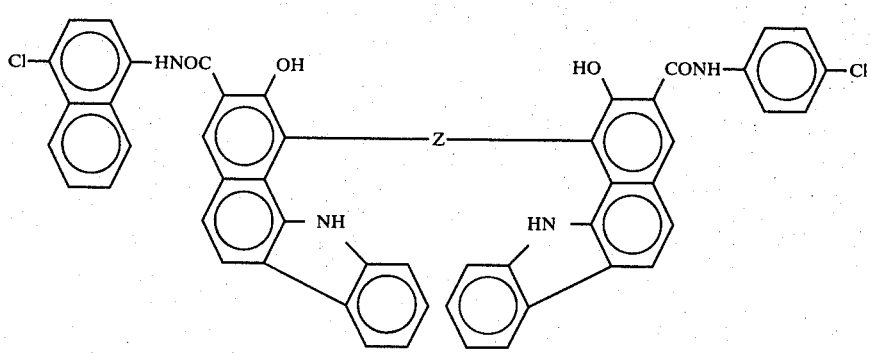
100C
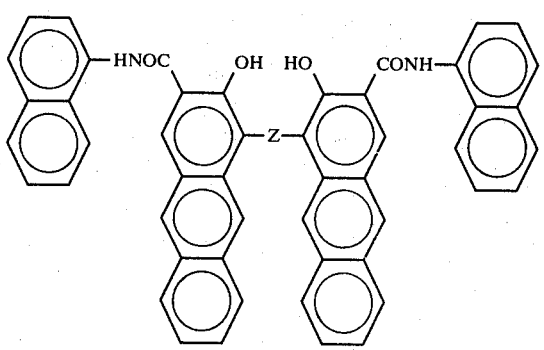
101C
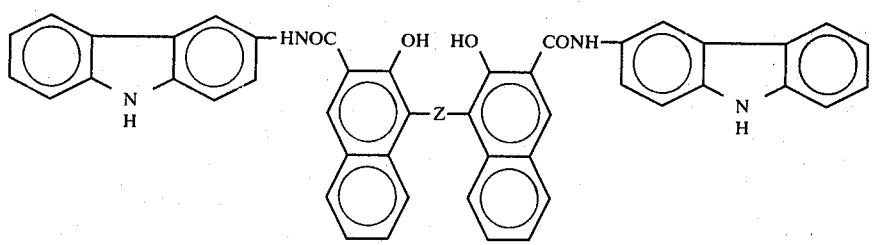
102C

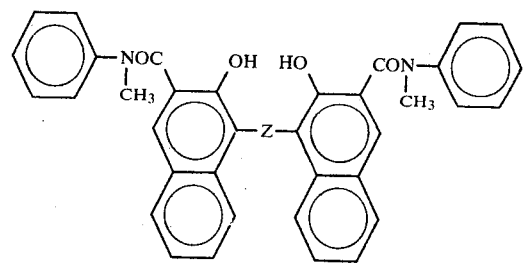
103C
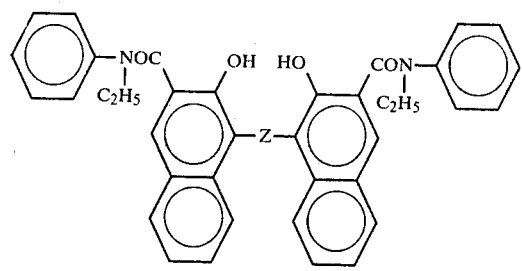
104C
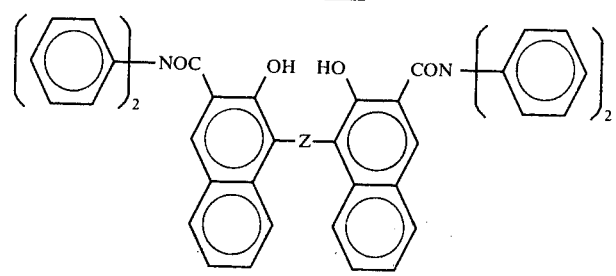
105C
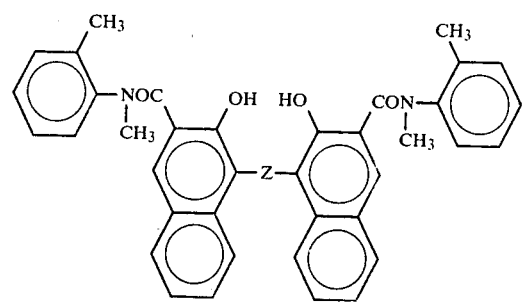
106C
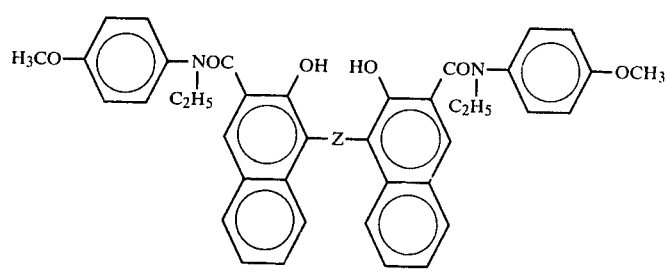
107C
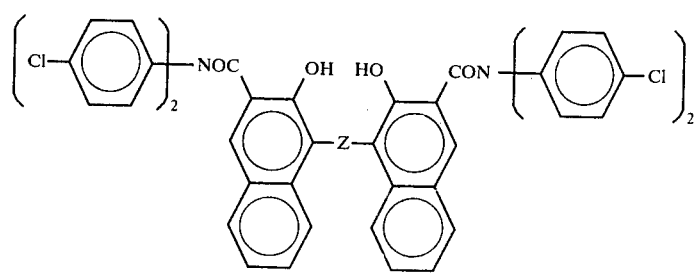
108C

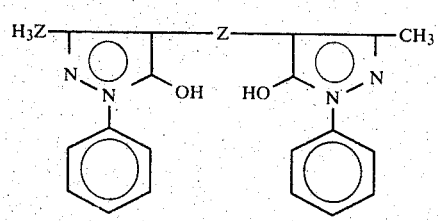 109C
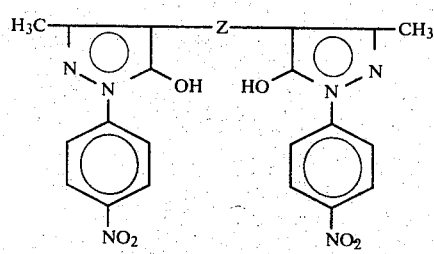 110C
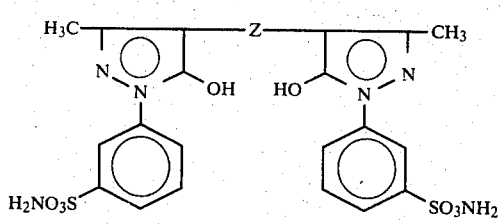 111C
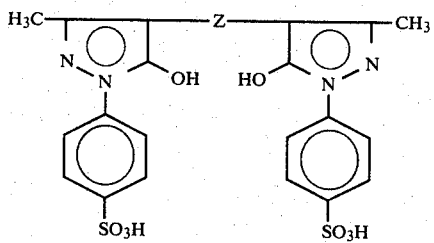 112C
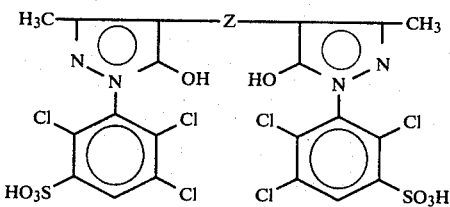 113C
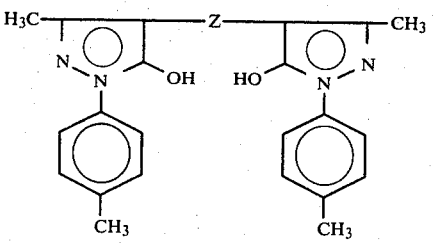 114C
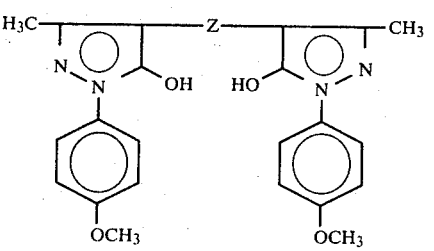 115C

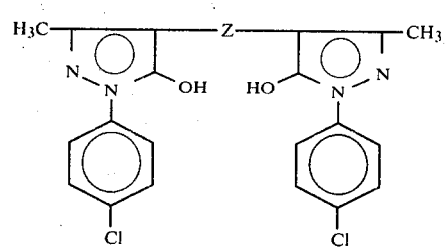 116C
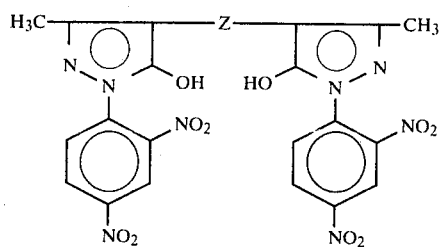 117C
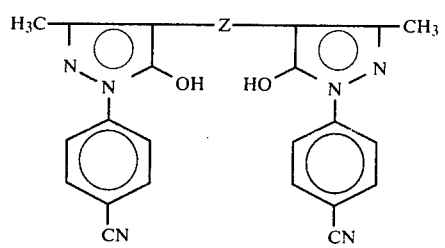 118C
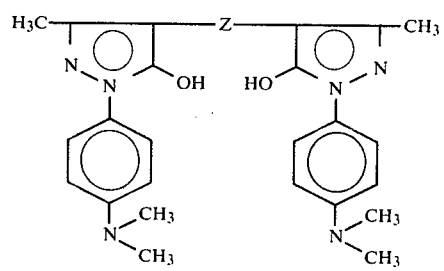 119C
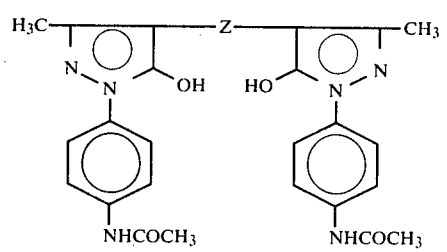 120C
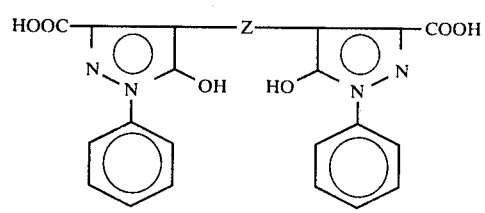 121C

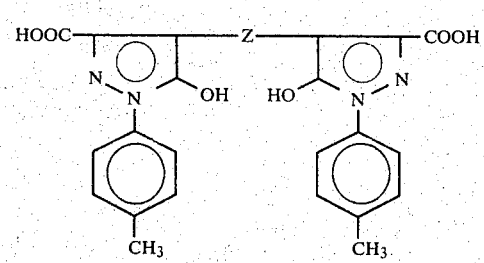 122C
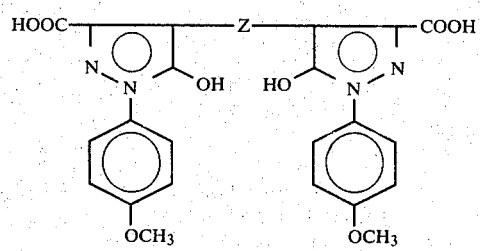 123C
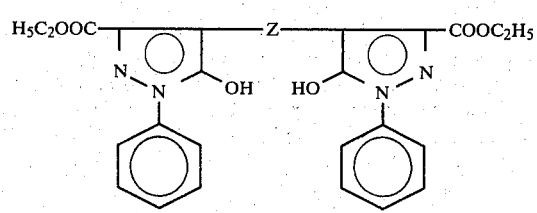 124C
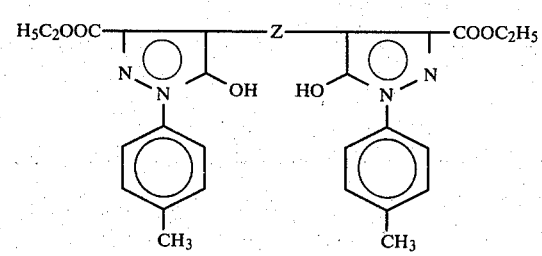 125C
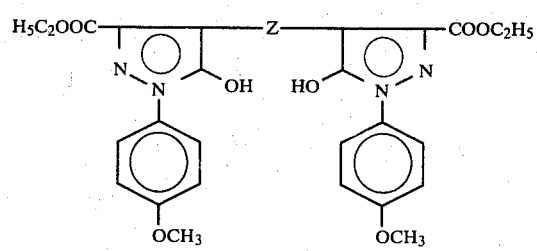 126C
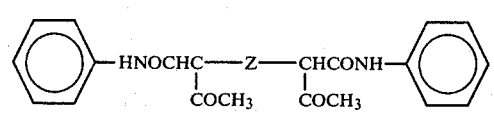 127C
128C
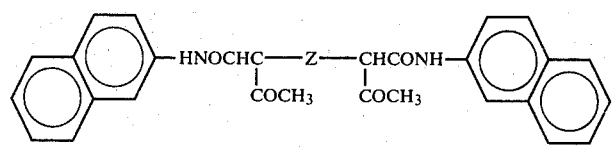 129C -continued

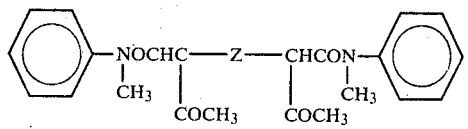

130C

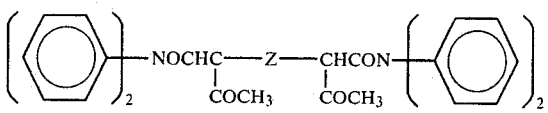

131C

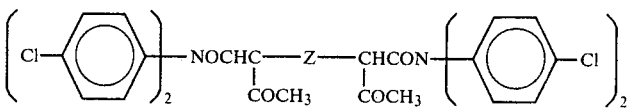

132C

The disazo pigments expressed by the general formula III can be easily prepared through the aforesaid process for preparing the disazo pigments expressed by the general formula I excepting the use of diamino derivatives of the corresponding stilbene as the starting material. For instance, the process of preparing the aforesaid pigment No. 1C is as described in the following. Further, other disazo pigments expressed by the general formula III can also be prepared in accordance with this preparation example excepting for changing the material used.

Preparation Example 1.5 g of 2,2′-diaminostilbene is added to a dilute hydrochloric acid consisting of 12.6 ml of concentrated hydrochloric acid and 12.6 ml of water, and same is well stirred at 60° C. for about 30 minutes.

Next, this mixture is cooled to about 0° C., and a solution obtained by dissolving 1.1 g of sodium nitrite in 1.7 ml of water is added dropwise to said mixture at a temperature of −1°∼0° C. for about 30 minutes. Then, the same is stirred at the same temperature for about 30 minutes, a small amount of unreacted matter is filtrated, the filtrate is poured in 11 ml of 42% borofluoric acid, the so separated crystals are removed by filtration, washed with water and dried to obtain 2.4 g (the yield 83%) of yellow-colored crystals of bisdiazonium-bistetrafluoroborate. The decomposition point is about 130° C.

Next, the thus obtained 2.0 g of bisdiazonium salt and 2.9 g of 2-hydroxy-3-phenylcarbamoylnaphthalene as a coupler are dissolved in 425 ml of cooled N,N-dimethylformamide, a solution consisting of 4.1 g of sodium acetate and 60 ml of water is added dropwise thereto at a temperature of 4°–8° C. for 1 hour, and then the same is stirred at room temperature for about 3 hours. Thereafter, precipitates are removed by filtration, washed 3 times with 300 ml of water, and further washed 8 times with 300 ml of N,N-dimethylformamide. Still residual N,N-dimethylformamide is washed away with acetone, and thus obtained pale and dark crystals are dried at 70° C. under reduced pressure of 2 mmHg to obtain 3.0 g (the yield 79%) of disazo pigment No. 1C. The melting point is over 300° C.

| Elementary analysis (as $C_{48}H_{34}N_6O_4$) | | |
| --- | --- | --- |
| | Calculated value | Observed value |
| C (%) | 75.97 | 75.53 |
| H (%) | 4.52 | 4.32 |
| N (%) | 11.08 | 10.80 |
| IR Absorption Spectrum (KBr tablet) 1680 cm$^{-1}$ (Secondary amide) | | |

Hereinafter will be shown concrete examples of compounds expressed by the general formula IV.

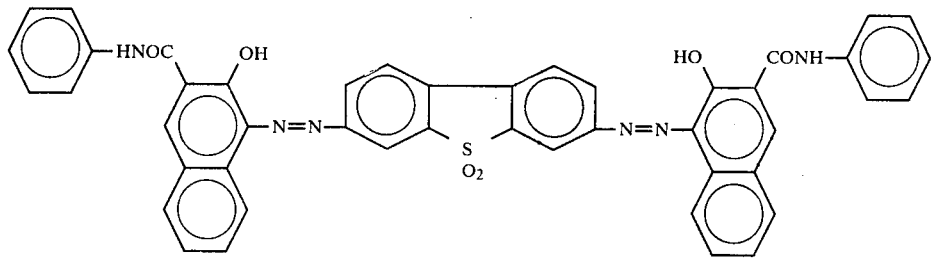

The portion

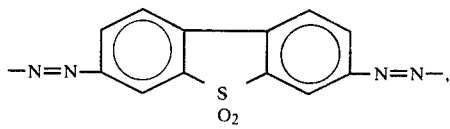

being common to Compounds No. 2D-66D, is omitted and represented as —$Y_4$— in short hereinafter.

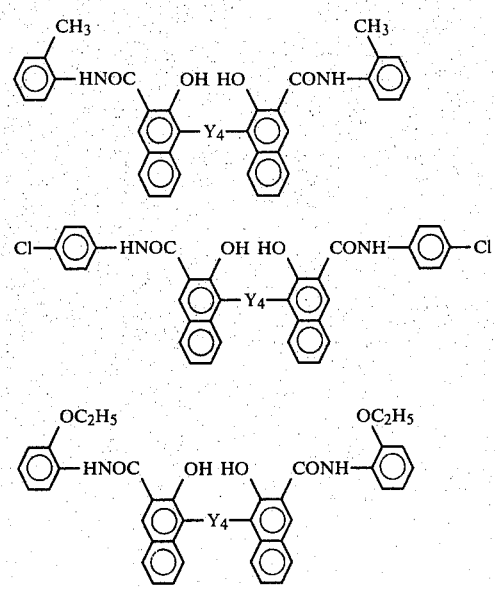
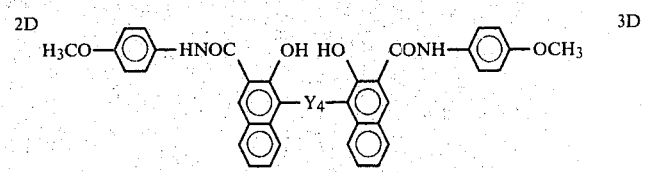
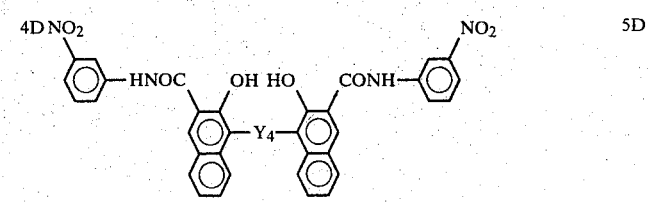
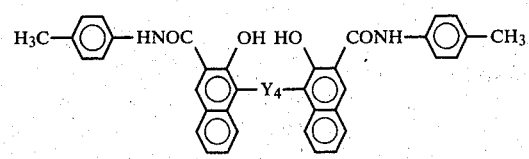
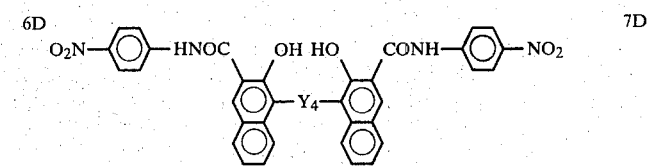
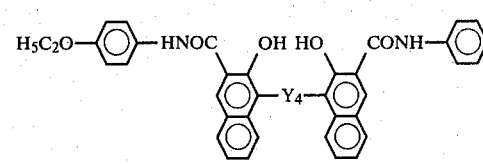
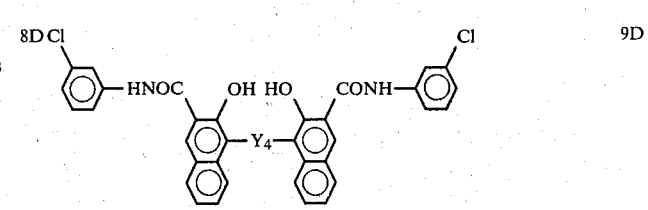
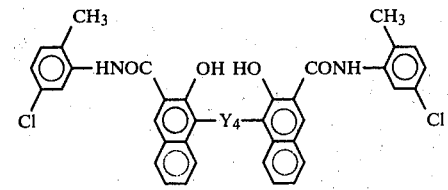
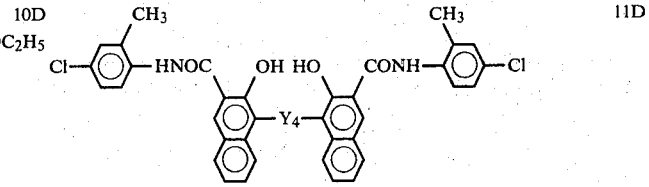
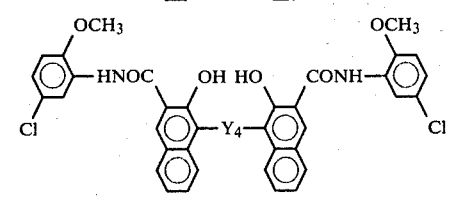
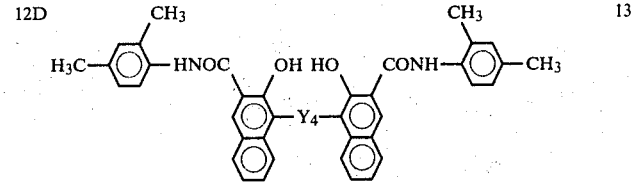
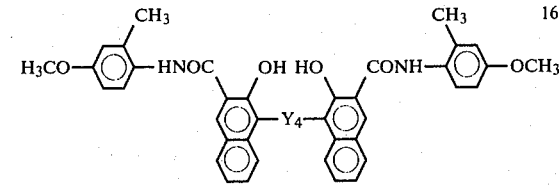
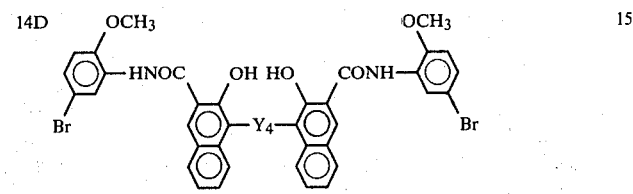
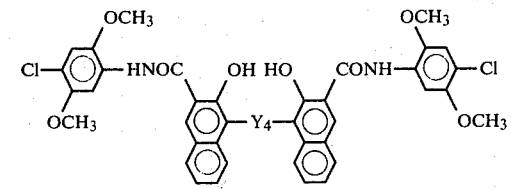
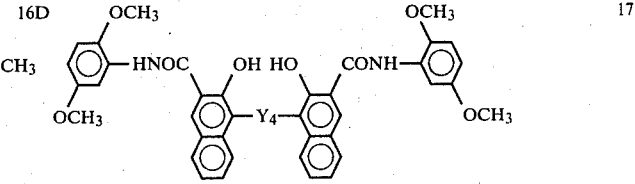
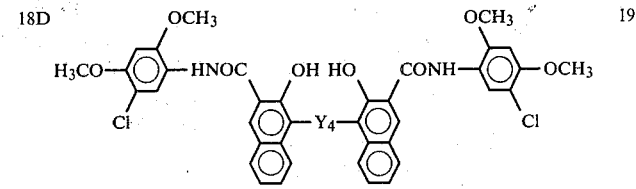

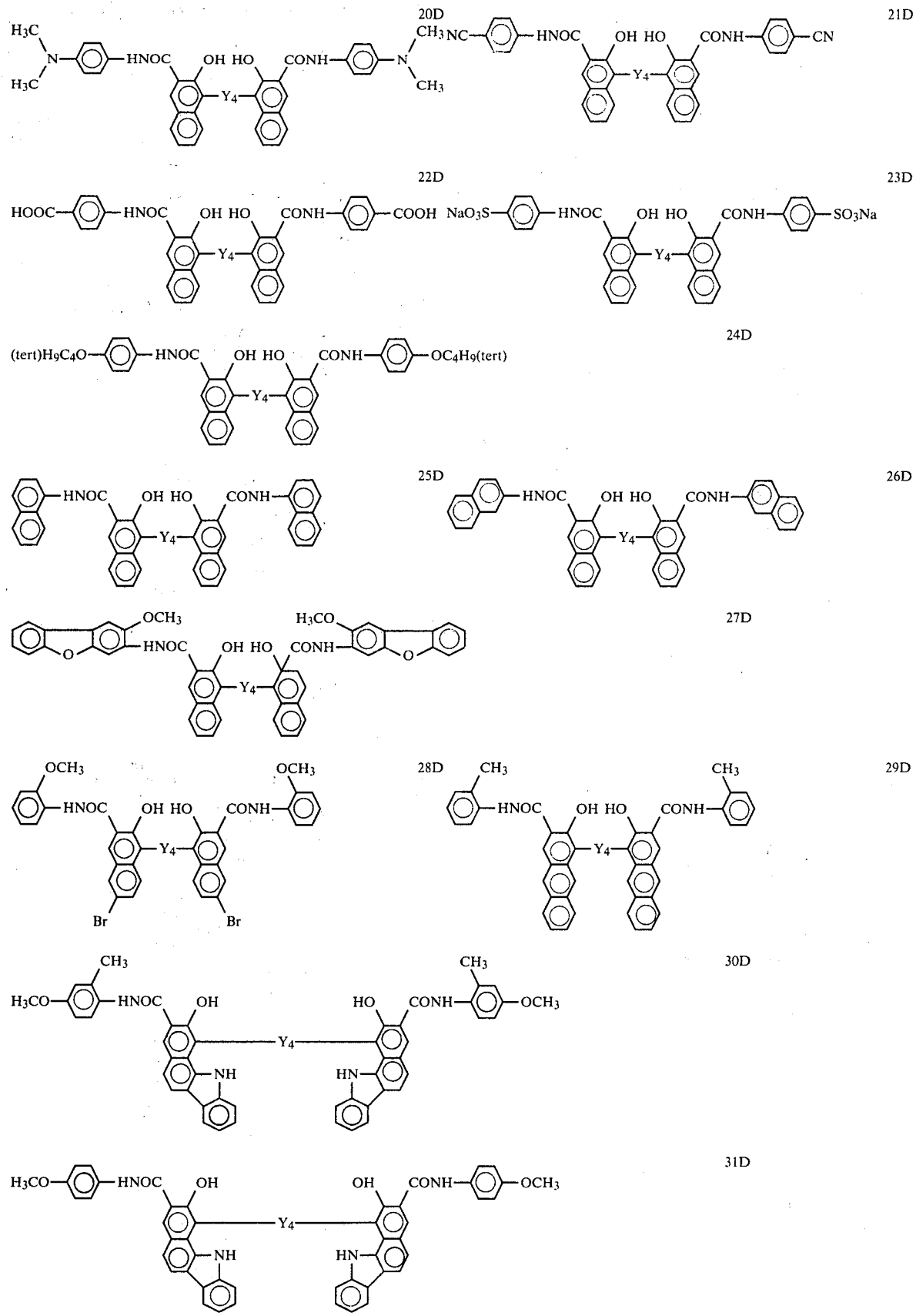

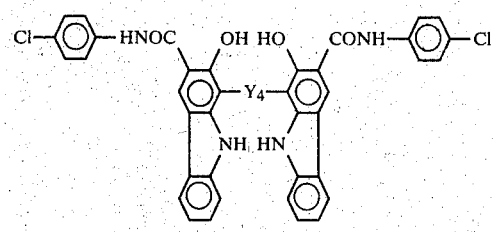  32D
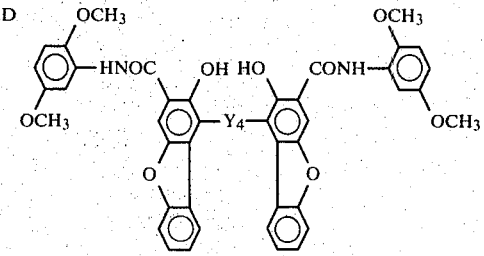  33D
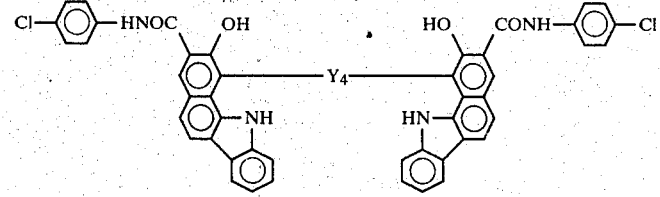  34D
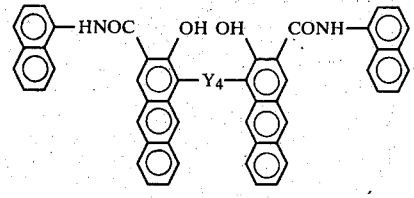  35D
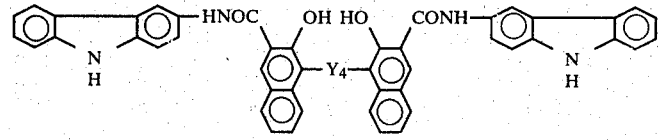  36D
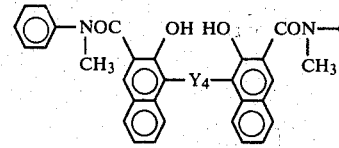  37D
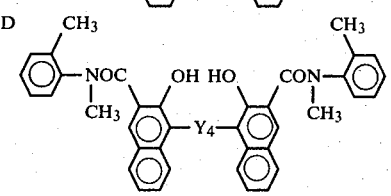  38D
  39D  40D
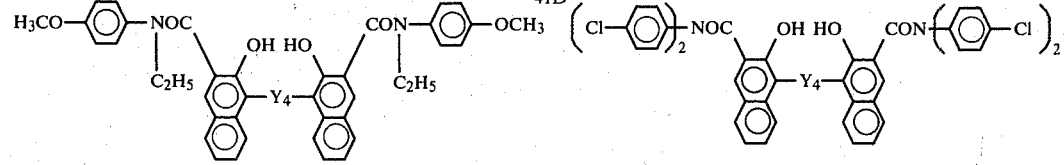  41D  42D
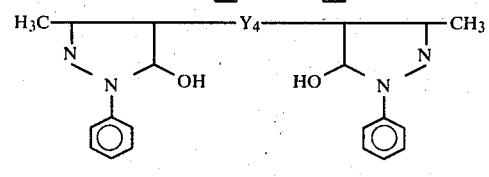  43D  44D
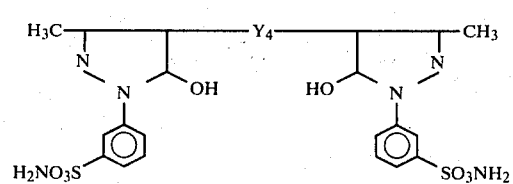
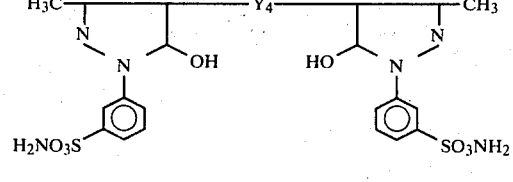  45D  46D
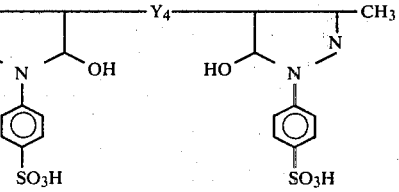

-continued
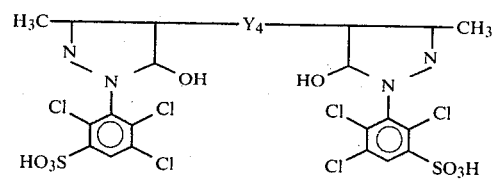
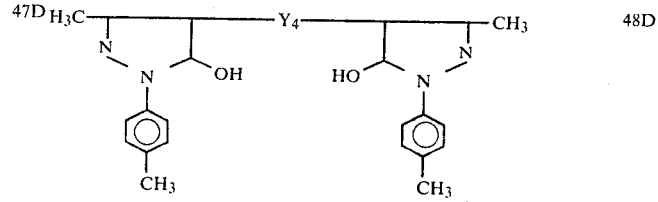 47D, 48D
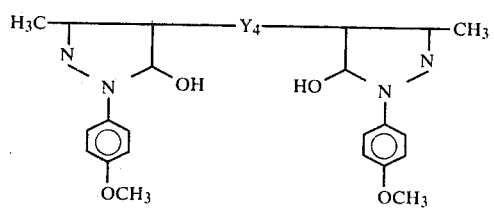
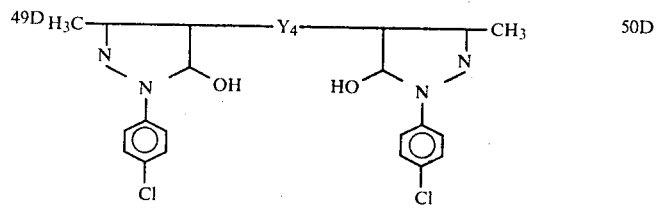 49D, 50D
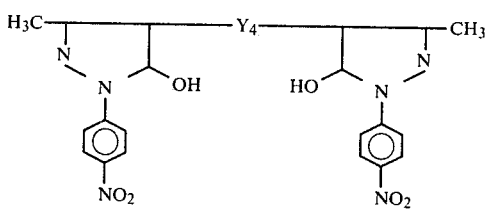
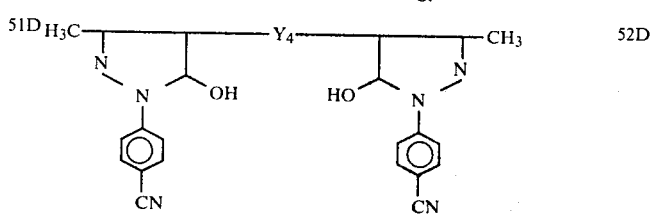 51D, 52D
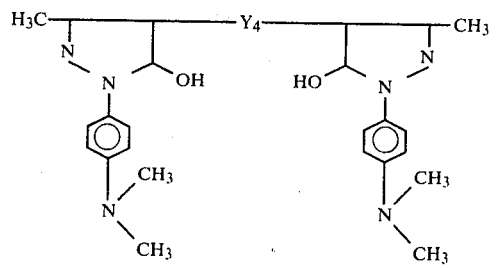
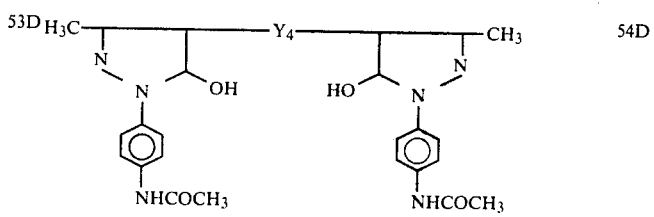 53D, 54D
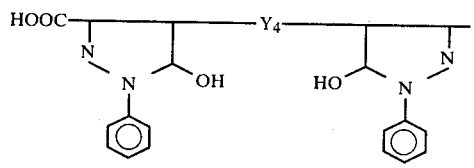
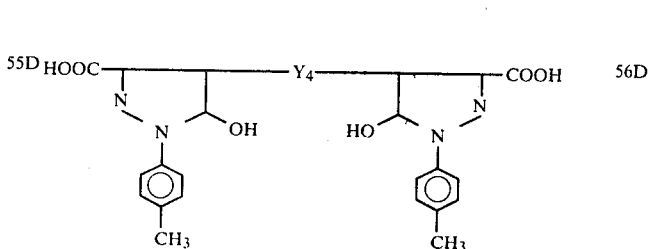 55D, 56D
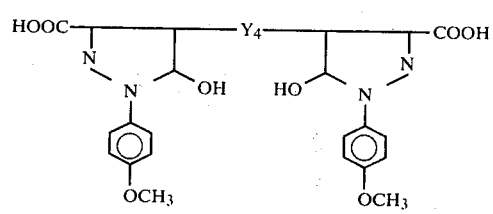
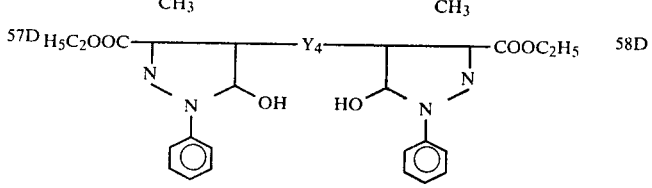 57D, 58D
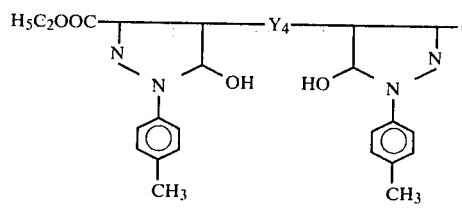
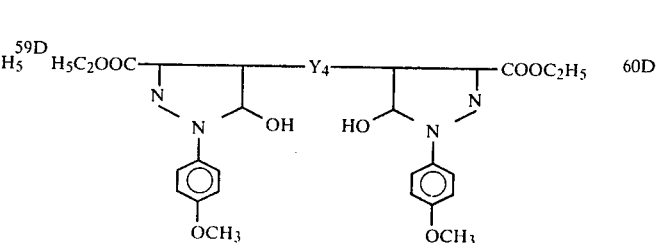 59D, 60D
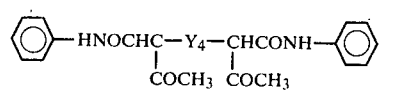 
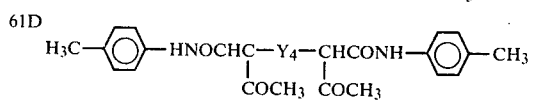 61D, 62D
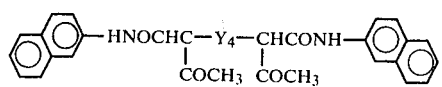
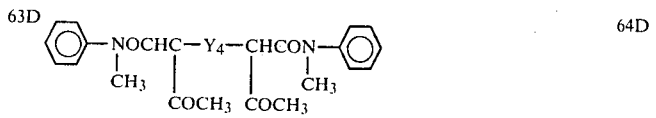 63D, 64D

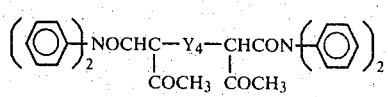
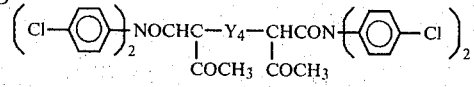

The disazo pigments expressed by the general formula IV can be easily prepared through the aforesaid process for preparing the disazo pigment expressed by the general formula I excepting the use of 3,7-diaminodibenzothiophene-5,5-dioxide as the starting material. For instance, the process of preparing the aforesaid pigment No. 1D is as described in the following. Further, other disazo pigments expressed by the general formula IV can also be prepared in accordance with this preparation example excepting for changing the material used.

Preparation Example 1.3 g of 3,7-diaminodibenzothiophene-5,5-dioxide is added to a dilute hydrochloric acid consisting of 9 ml of concentrated hydrochloric acid and 9 ml of water, and same is well stirred at 80° C. for about 30 minutes. Next, this mixture is cooled to about 0° C., and a solution obtained by dissolving 0.8 g of sodium nitrite in 1 ml of water is added dropwise to said mixture at a temperature of 0°–5° C. for about 30 minutes. Then, the same is stirred at the same temperature for about 30 minutes, a small amount of unreacted matter is filtrated, the filtrate is poured in 10 ml of 42% borofluoric acid, the so separated crystals are removed by filtration, washed with water and dried to obtain 2.2 g (the yield 99%) of yellow-colored crystals of bisdiazoniumbistetrafluoroborate. The decomposition point is about 140° C. Next, the thus obtained 2.2 g of bisdiazonium salt and 2.9 g of 2-hydroxy-3-phenylcarbamoylnaphthalene as a coupler are dissolved in 425 ml of cooled, N,N-dimethylformamide, a solution consisting of 4.1 g of sodium acetate and 60 ml of water is added dropwise thereto at a temperature of 4°–8° C. for 1 hour, and then the same is stirred at room temperature for about 3 hours. Thereafter, precipitates are removed by filtration, washed 3 times with 300 ml of water, and further washed 8 times with 300 ml of N,N-dimethylformamide. Still residual N,N-dimethylformamide is washed away with acetone, and thus obtained pale and dark crystals are dried at 70° C. under reduced pressure of 2 mmHg to obtain 3.2 g (the yield 30%) of disazo pigment No. 1D. The melting point is over 300° C.

| Elementary analysis results (as $C_{46}H_{30}N_6O_6S$) | | |
| --- | --- | --- |
| | Calculated value | Observed value |
| C (%) | 69.51 | 68.95 |
| H (%) | 3.80 | 3.79 |
| N (%) | 10.57 | 10.85 |
| IR Absorption Spectrum (KBr tablet) | | |
| 1680 cm$^{-1}$ | | (Secondary amide) |

Figure 1:
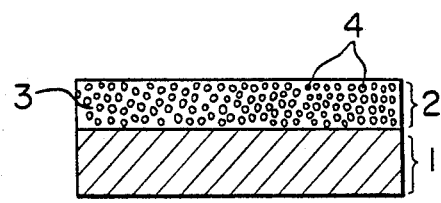
FIG. 1 through FIG. 4 illustrate, respectively, enlarged cross-sectional views of photosensitive materials according to the present invention.

Among the reference numerals in the drawings, 1 denotes a conductive support, 2, 2', 2" and 2''' denote respectively a photosensitive layer, 3 denotes a binder, 4 denotes a disazo compound, 5 denotes a charge-transfer medium, 6 denotes a charge-carrier generating layer, and 7 denotes a charge-transfer medium layer.

Figure 2:
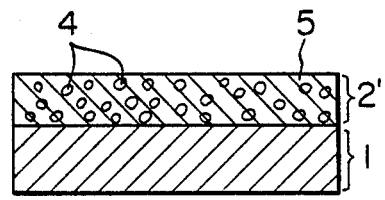
Figure 3:
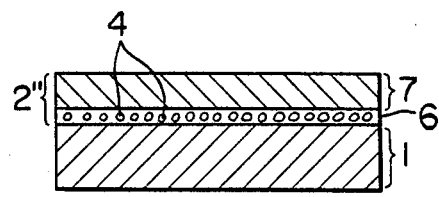
Figure 4:
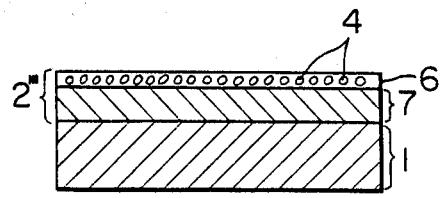

The photosensitive materials according to the present invention contain the above mentioned disazo pigments represented by the general formulas I, II, III and IV and can assume such structures as illustrated in FIGS. 1–4 according to the way of application of these pigments. The photosensitive material illustrated in FIG. 1 is one prepared by forming a disazo pigment 4 (which serves herein as a photoconductive substance)-resinous binder 3 type photosensitive layer 2 on a conductive support 1. The photosensitive material illustrated in FIG. 2 is one prepared by forming a disazo pigment 4 (which serves herein as a charge-carrier generating substance)-charge transfer medium (which is a mixture of charge-transfer substance and a resinous binder) 5 type photosensitive layer 2' on a conductive support 1. And the photosensitive materials illustrated in FIGS. 3–4 are modifications of the photosensitive material illustrated in FIG. 2 and the photosensitive layers 2" and 2''' are each composed of a charge-carrier generating layer 6 consisting essentially of the disazo pigment 4 and a charge-transfer medium layer 7. The respective ingredients of these photosensitive materials are supposed to assume such function and mechanism as mentioned hereinafter.

First, in the photosensitive material of FIG. 1, the disazo pigment acts as a photoconductive substance, and generation and transfer of the charge-carrier necessary for light decay is performed through the pigment particles. In the case of the photosensitive material of FIG. 2, the charge-transfer substance forms a charge-transfer medium together with the binder (plus a plasticizer as occasion demands), while the disazo pigment acts as a charge-carrier generating substance. This charge-transfer medium has no charge-carrier generating ability as disazo pigments do, but it has an ability to accept and transfer the charge-carrier generated by disazo pigments. That is, in the case of the photosensitive material of FIG. 2, generation of the charge-carrier necessary for light decay is performed by the disazo pigment, while transfer of the charge-carrier is performed mainly by the charge-transfer medium. An additional essential condition required for the charge-transfer medium on this occasion is that the scope of absorption wavelength of the charge-transfer medium should not fall on mainly the scope of absorption wavelength of the visible region of the disazo pigment. The reason for this is that it is necessary to transmit the light to the surface of the disazo pigment in order to generate the charge carrier efficiently in the said pigment. This, however, is not applicable to the case of, for instance, a photosensitive material which is sensitive only to a specific wavelength. Therefore, it will do if the absorption wavelengths of both the charge-transfer medium and the disazo pigment do not completely overlap each other. Next, in the case of the photosensitive material of FIG. 3, the light after passing through the charge-transfer medium layer reaches to the photosensitive layer 2" which acts as a charge-carrier generating layer, whereby generation of the charge-carrier is performed by the disazo pigment present in the portion, while the charge-transfer medium layer accepts the charge-carrier poured therein and transfers. The mechanism of this photosensitive material that generation of the charge-carrier required for light decay is performed by the disazo pigment and transfer of the charge-carrier is performed by the charge-transfer medium is the same as in the case of the photosensitive material illustrated in FIG. 2. The disazo pigment herein is likewise a charge-carrier generating substance. In this regard it is to be noted that the operation mechanism of the charge-transfer medium and charge-carrier generating layer in the photosensitive material of FIG. 4 is the same as in the case of the photosensitive material of FIG. 3.

In order to prepare the photosensitive material of FIG. 1, it suffices to coat a conductive support with a dispersion obtained by dispersing fine particles of a disazo pigment in a binder solution and then dry. In order to prepare the photosensitive material of FIG. 2, it suffices to disperse fine particles of a disazo pigment in a solution dissolved a charge-transfer substance and a binder therein, coat a conductive support with the resulting dispersion and then dry. And the photosensitive material of FIG. 3 can be obtained either by depositing a disazo pigment on a conductive support through vacuum evaporation or through the procedure comprising dispersing fine particles of a disazo pigment in an appropriate solvent dissolved a binder therein as occasion demands, coating the resulting dispersion on a conductive support and then drying and if further required, subjecting the thus formed photosensitive layer to the surface finishing, for instance, such as puff-grinding or the like or adjust the thickness of the coating film, thereafter coating thereon a solution containing a charge-transfer substance and a binder and drying. In this regard it is to be noted that in the case of the photosensitive material of FIG. 4 it can be obtained according to the procedure of preparing the photosensitive material of FIG. 3 wherein the order of forming the layers is reversed. In any case, the disazo pigment for use in the present invention is employed upon being pulverized into a particle size of less than 5μ, preferably less than 2μ, by means of a ball-mill or the like. Coating is effected using the conventional means such as doctor blade, wire bar, etc. The thickness of the photosensitive layers illustrated in FIGS. 1 and 2 is about 3–50μ, preferably 5–20μ. In the case of the photosensitive materials illustrated in FIGS. 3 and 4 the thickness of the charge-carrier generating layer is less than 5μ, preferably less than 2μ, and the thickness of the charge-transfer medium layer is about 3–50μ, preferably 5–20μ. In the case of the photosensitive material illustrated in FIG. 1, the proper amount of the disazo pigment contained in the photosensitive layer is 30–70% by weight, preferably about 50% by weight based on the weight of the photosensitive layer. (As above-described, in the case of the photosensitive material of FIG. 1 the disazo pigment acts as a photoconductive substance, and generation and transfer of the charge carrier required for light decay are performed through the pigment particles. Therefore, it is desirable that the contact between the pigment particles should be continuous from the photosensitive layer surface to the support. In view of this, it is desirable that the ratio of the disazo pigment to the photosensitive layer is as high as possible, but when taking both the strength and the sensitivity of the photosensitive layer into consideration, preferably it is about 50% by weight.) In the case of the photosensitive material illustrated in FIG. 2, the proper amount of the disazo pigment contained in the photosensitive layer is 1–50% by weight, preferably less than 20% by weight, and the proper amount of the charge-transfer substance therein is 10–95% by weight, preferably 30–90% by weight. And in the case of the photosensitive materials illustrated in FIGS. 3–4 the amount of the charge-transfer substance contained in the charge-transfer medium layer is 10–95% by weight, preferably 30–90% by weight as in the case of the photosensitive layer of the photosensitive material illustrated in FIG. 2. Further, in preparing all the photosensitive materials illustrated in FIGS. 1–4, it is possible to employ some plasticizer in combination with the binder.

In the photosensitive materials of the present invention there can be employed, as the conductive support, a plate or foil of a metal such as aluminum, etc., a plastic film deposited thereon a metal such as aluminum, etc. through vacuum evaporation, or a paper processed for conductivity. As binders suitably employed in the present invention, there are enumerated such condensation resins such as polyamide, polyurethane, polyester, epoxide resin, polyketone, polycarbonate, etc., vinyl polymers such as polyvinyl ketone, polystyrene, poly-N-vinyl carbazole, polyacrylamide, etc., and the like, but in spite of this, resins which are insulating and adhesive are all employable. As available plasticizers there can be enumerated halogenated paraffin, polyvinyl chloride, dimethyl naphthalene, dibutyl phthalate, etc. And as available charge-transfer substances there can be enumerated, as high molecular substances, vinyl polymers such as poly-N-vinyl carbazole, halogenated poly-N-vinyl carbazole, polyvinyl pyrene, polyvinyl indroquinoxaline, polyvinyl dibenzothiophene, polyvinyl anthracene, polyvinyl acridine, etc. and condensation resins such as pyrene-formaldehyde resin, bromopyrene-formaldehyde resin, ethyl carbazole-formaldehyde resin, chloroethyl carbazole-formaldehyde resin, etc., and as low molecular substances (monomers), fluorenone, 2-nitro-9-fluorenone, 2,7-dinitro-9-fluorenone, 2,4,7-trinitro-9-fluorenone, 2,4,5,7-tetranitro-9-fluorenone, 4H-indeno[1,2-b]thiophen-4-one, 2-nitro-4H-indeno[1,2-b]thiophen-4-one, 2,6,8-trinitro-4H-indeno[1,2-b]thiophen-4-one, 8H-indeno[2,1-b]thiophen-8-one, 2-intro-8H-indeno[2,1-b]thiophen-8-one, 2-bromo-6,8-dinitro-4H-indeno[1,2-b]thiophene, 6,8-dinitro-4H-indeno[1,2-b]thiophene, 2-nitrodibenzothiophene, 2,8-dinitrodibenzothiophene, 3-nitrodibenzothiophene-5-oxide, 3,7-dinitrodibenzothiophene-5-oxide, 1,3,7-trinitrodibenzothiophene-5,5-dioxide, 3-nitro-dibenzothiophene-5,5-dioxide, 3,7-dinitro-dibenzothiophene-5,5-dioxide, 4-dicyanomethylene-4H-indeno[1,2-b]thiophene, 6,8-dinitro-4-dicyanomethylene-4H-indeno[1,2-b]thiophene, 1,3,7,9-tetranitrobenzo[c]cinnoline-5-oxide, 2,4,10-trinitrobenzo[c]cinnoline-6-oxide, 2,4,8-trinitrobenzo[c]cinnoline-6-oxide, 2,4,8-trinitrothioxanthone, 2,4,7-trinitro-9,10-phenanthrene-guinone, 1,4-naphthoquinone-benzo[a]anthracene-7,12-dione, 2,4,7-trinitro-9-dicyanomethylene fluorene, tetrachlorophthalic anhydride, 1-bromopyrene, 1-methylpyrene, 1-ethylpyrene, 1-acetylpyrene, carbazole, N-ethylcarbazole, N-β-chloroethylcarbazole, N-β-hydroxyethyl carbazole, 2-phenyl indole, 2-phenylnaphthalene, 2,5-bis(4-diethylaminophenyl)-1,3,4-oxadiazole, 2,5-bis(4-diethylaminophenyl)-1,3,4-triazole, 1-phenyl-3-(4-diethylaminostyryl)-5-(4-diethylaminophenyl)pyrazoline, 2-phenyl-4-(4-diethylaminophenyl)-5-phenyloxazole, triphenyl amine, tris(4-diethylaminophenyl)methane, 3,6-bis(dibenzylamino)-9-ethyl carbazole, etc. These charge-transfer substances are employed either singly or in a combination of two or more of them.

Further, in every photosensitive material thus prepared an adhesive layer or a barrier layer can be disposed in between the conductive support and the photosensitive layer as occasion demands. The material suitably used in the formation of aforesaid layers includes polyamide, nitrocellulose, aluminum oxide, etc. and preferably the thickness of the layers is less than $1\mu$.

Reproduction using the photosensitive material according to the present invention can be achieved through the procedure comprising electrifying the photosensitive layer side of the photosensitive material, exposing and then developing, and if necessary, transferring onto an ordinary paper or the like.

The photosensitive materials according to the present invention have excellent advantages in that they are generally of high sensitivity and rich in flexibility.

DESCRIPTION OF PREFERRED EMBODIMENTS

Example 1

1 part by weight of polyester resin (namely, Polyester Adhesive 49000, the manufacture of Du Pont Inc.), 1 part by weight of the disazo compound No. 1A and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a $7\mu$-thick photosensitive layer and a structure illustrated in FIG. 1.

Subsequently, after charging positive electricity on the photosensitive layer of this photosensitive material by applying +6 KV corona discharge for 20 seconds by means of a commercial electrostatic copying paper testing apparatus, the photosensitive material was left alone in the dark for 20 seconds, and the surface potential Vpo(volt) at the time was measured. Next, light was applied to the photosensitive layer by means of a tungsten lamp so as to attain the illumination of 20 luxes on the surface thereof, and the time (unit:second) required for reducing said surface potential Vpo to half was sought, whereby the amount of exposure $E\frac{1}{2}$ (lux.sec.) was obtained. The result was as follows:

Vpo = 590 V, $E\frac{1}{2}$ = 15 lux.sec.

Examples 2 through 10

Varieties of photosensitive materials were prepared by applying the same procedure as in Example 1 save for employing the respective disazo compounds referred to by number in the following Table-1 in place of the disazo compound No. 1A used in Example 1. When these photosensitive materials were subsequently subjected to the same measurement of Vpo and $E\frac{1}{2}$ as in Example 1, the result was as shown in Table-1, respectively.

TABLE-1

| Example No. | Disazo compound No. | Vpo (volt) | E1/2 (lux . sec.) |
|---|---|---|---|
| 2 | 4A | 630 | 8 |
| 3 | 17A | 800 | 5 |
| 4 | 18A | 700 | 15 |

TABLE-1-continued

| Example No. | Disazo compound No. | Vpo (volt) | E1/2 (lux . sec.) |
|---|---|---|---|
| 5 | 32A | 710 | 19 |
| 6 | 37A | 725 | 30 |
| 7 | 49A | 680 | 21 |
| 8 | 58A | 695 | 25 |
| 9 | 62A | 710 | 25 |
| 10 | 65A | 800 | 30 |

Example 11

10 parts by weight of polyester resin (the same as that in Example 1), 10 parts by weight of 2,4,7-trinitro-9-fluorenone, 2 parts by weight of disazo compound No. 1A and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a $10\mu$-thick photosensitive layer and a structure illustrated in FIG. 2. Subsequently, measurement of Vpo and $E\frac{1}{2}$ of this photosensitive material was conducted through the same procedure as in Example 1 save for applying −6 KV corona discharge instead of +6 KV corona discharge employed in Example 1. The result was as follows:

Vpo = 450 V, $E\frac{1}{2}$ = 10 lux.sec.

Examples 12 through 20

Varieties of photosensitive materials having a structure illustrated in FIG. 2 were prepared by applying the same procedure as in Example 11 save for employing the respective disazo compounds referred to by number in the following Table-2 in place of the disazo compound No. 1A used in Example 11. When these photosensitive materials were subsequently subjected to the same measurement of Vpo and $E\frac{1}{2}$ as in Example 11, the result was as shown in Table-2, respectively.

TABLE-2

| Example No. | Disazo compound No. | Vpo (volt) | E1/2 (lux . sec.) |
|---|---|---|---|
| 12 | 3A | 480 | 10 |
| 13 | 5A | 520 | 15 |
| 14 | 11A | 450 | 20 |
| 15 | 23A | 500 | 15 |
| 16 | 25A | 500 | 15 |
| 17 | 35A | 450 | 10 |
| 18 | 38A | 480 | 20 |
| 19 | 41A | 600 | 20 |
| 20 | 60A | 750 | 25 |

Example 21

10 parts by weight of polyester resin (the same as that in Example 1), 10 parts by weight of 2,5-bis(4-diethylaminophenyl)-1,3,4-oxadiazole, 2 parts by weight of the disazo compound No. 1A and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 2. When this photosensitive material was subsequently subjected to the same measurement as in Example 1, the result was as follows:

Vpo=830 V, E½=10 lux.sec.

Examples 22 through 30

Varieties of photosensitive materials having a structure illustrated in FIG. 2 were prepared by applying the same procedure as in Example 21 save for employing the respective disazo compounds referred to by number in the following Table-3 in place of the disazo compound No. 1A used in Example 21. When these photosensitive materials were subsequently subjected to the same measurement of Vpo and E½ as in Example 1, the result was as shown in the following Table-3, respectively.

TABLE-3

| Example No. | Disazo compound No. | Vpo (volt) | E1/2 (lux . sec.) |
|---|---|---|---|
| 22 | 2A | 900 | 15 |
| 23 | 9A | 850 | 18 |
| 24 | 13A | 880 | 16 |
| 25 | 28A | 800 | 9 |
| 26 | 33A | 900 | 15 |
| 27 | 45A | 820 | 17 |
| 28 | 47A | 930 | 10 |
| 29 | 52A | 950 | 15 |
| 30 | 66A | 910 | 20 |

Example 31

200 parts by weight of poly-N-vinyl carbazole, 33 parts by weight of 2,4,7-trinitro-9-fluorenone, 20 parts by weight of polyester resin (the same as that in Example 1) and 20 parts by weight of the disazo compound No. 1A as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13μ-thick photosensitive layer and a structure illustrated in FIG. 2. When this photosensitive material was subjected to the same measurement as in Example 1, the result was as follows:

Vpo=1,035 V, E½=5 lux.sec.

Examples 32 through 40

Varieties of photosensitive materials having a structure illustrated in FIG. 2 were prepared by applying the same procedure as in Example 31 save for employing the respective disazo compound referred to by number in the following Table-4 in place of the disazo compound No. 1A used in Example 31. When these photosensitive materials were subsequently subjected to the same measurement of Vpo and E½ as in Example 1, the result was as shown in the following Table-4, respectively.

TABLE-4

| Example No. | Disazo compound No. | Vpo (volt) | E1/2 (lux . sec.) |
|---|---|---|---|
| 32 | 9A | 1035 | 6 |
| 33 | 10A | 1040 | 7 |
| 34 | 17A | 1100 | 7 |
| 35 | 29A | 1100 | 8 |
| 36 | 40A | 1150 | 5 |
| 37 | 42A | 1200 | 15 |
| 38 | 51A | 1280 | 10 |
| 39 | 63A | 1430 | 19 |
| 40 | 64A | 1500 | 15 |

Example 41

2 parts by weight of the disazo compound No. 1A and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co., Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 3. When the thus obtained photosensitive material was subjected to the same measurement as in Example 1, the result was as follows:

Vpo=850 V, E½=15 lux.sec.

Examples 42 through 50

Varieties of photosensitive materials having a structure illustrated in FIG. 3 were prepared by applying the same procedure as in Example 41 save for employing the respective disazo compounds referred to by number in the following Table-5 in place of the disazo compound No. 1A used in Example 41. When these photosensitive materials were subjected to the same measurement of Vpo and E½ as in Example 1, the result was as shown in Table-5, respectively.

TABLE-5

| Example No. | Disazo compound No. | Vpo (volt) | E½ (lux . sec.) |
|---|---|---|---|
| 42 | 8A | 850 | 9 |
| 43 | 15A | 880 | 10 |
| 44 | 21A | 880 | 10 |
| 45 | 30A | 870 | 8 |
| 46 | 33A | 870 | 9 |
| 47 | 43A | 855 | 10 |
| 48 | 53A | 865 | 10 |
| 49 | 55A | 880 | 15 |
| 50 | 61A | 880 | 15 |

Example 51

2 parts by weight of the disazo compound No. 1A and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as that in Example 41) and 46 parts by weight of tetrahydrofuran together, and this dispersion was coated on the foregoing charge-carrier generating layer by means of a doctor blade and then dried at a temperature of 120° C. for 10 minutes to form a 10μ-thick charge-transfer medium layer, whereby there was obtained a laminate-type photosensitive material illustrated in FIG. 3. When the thus obtained photosensitive material was subjected to the same measurement of Vpo and $E_{\frac{1}{2}}$ as in Example 1 save for applying −6 KV corona discharge instead of +6 KV corona discharge, the result was as follows:

Vpo=1,000 V, $E_{\frac{1}{2}}$=8 lux.sec.

Examples 52 through 60

Varieties of photosensitive materials having the same structure as that of Example 51 were prepared by employing the respective disazo compound referred to by number in the following Table-6 in place of the disazo compound No. 1A used in Example 51. When these photosensitive materials were subjected to the same measurement of Vpo and $E_{\frac{1}{2}}$ as in Example 1, the result was as shown in Table-6, respectively.

TABLE-6

| Example No. | Disazo compound No. | Vpo (volt) | $E_{\frac{1}{2}}$ (lux.sec.) |
|---|---|---|---|
| 52 | 6A | 1000 | 5 |
| 53 | 14A | 950 | 8 |
| 54 | 19A | 980 | 5 |
| 55 | 22A | 990 | 7 |
| 56 | 27A | 990 | 9 |
| 57 | 36A | 1020 | 10 |
| 58 | 44A | 990 | 12 |
| 59 | 48A | 1000 | 15 |
| 60 | 53A | 1100 | 20 |

Example 61

1 part by weight of polyester resin (namely, Polyester Adhesive 49000, the manufacture of Du Pont Inc.), 1 part by weight of the disazo compound No. 1B and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure illustrated in FIG. 1.

Subsequently, after charging positive electricity on the photosensitive layer of this photosensitive material by applying +6 KV corona discharge for 20 seconds by means of a commercial electrostatic copying paper testing apparatus, the photosensitive material was left alone in the dark for 20 seconds, and the surface potential Vpo(volt) at that time was measured. Next, light was applied to the photosensitive layer by means of a tungsten lamp so as to attain the illumination of 20 luxes on the surface thereof, and the time (unit:second) required for reducing said surface potential Vpo to half was sought, whereby the amount of exposure $E_{\frac{1}{2}}$ (lux.-sec.) was obtained. The result was as follows:

Vpo=500 V, $E_{\frac{1}{2}}$=12 lux.sec.

Examples 62 through 70

Varieties of photosensitive materials were prepared by applying the same procedure as in Example 61 save for employing the respective disazo compounds referred to by number in the following Table-7 in place of the disazo compound No. 1B used in Example 61. When these photosensitive materials were subsequently subjected to the same measurement of Vpo and $E_{\frac{1}{2}}$ as in Example 61, the result was as shown in Table-7, respectively.

TABLE-7

| Example No. | Disazo compound No. | Vpo (volt) | $E_{\frac{1}{2}}$ (lux . sec.) |
|---|---|---|---|
| 62 | 4B | 620 | 10 |
| 63 | 17B | 600 | 12 |
| 64 | 18B | 680 | 10 |
| 65 | 32B | 620 | 15 |
| 66 | 37B | 630 | 20 |
| 67 | 49B | 690 | 19 |
| 68 | 58B | 680 | 25 |
| 69 | 62B | 680 | 25 |
| 70 | 65B | 690 | 30 |

Example 71

10 parts by weight of polyester resin (the same as that in Example 61), 10 parts by weight of 2,4,7-trinitro-9-fluorenone, 2 parts by weight of disazo compound No. 1B and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10μ-thick photosensitive layer and a structure illustrated in FIG. 2. Subsequently, measurement of Vpo and $E_{\frac{1}{2}}$ of this photosensitive material was conducted through the same procedure as in Example 61 save for applying −6 KV corona discharge instead of +6 KV corona discharge employed in Example 61. The result was as follows:

Vpo=520 V, $E_{\frac{1}{2}}$=9 lux.sec.

Examples 72 through 80

Varieties of photosensitive materials having a structure illustrated in FIG. 2 were prepared by applying the same procedure as in Example 71 save for employing the respective disazo compounds referred to by number in the following Table-8 in place of the disazo compound No. 1B used in Example 71. When these photosensitive materials were subsequently subjected to the same measurement of Vpo and $E_{\frac{1}{2}}$ as in Example 61, the result was as shown in Table-8, respectively.

TABLE-8

| Example No. | Disazo compound No. | Vpo (volt) | E½ (lux.sec.) |
|---|---|---|---|
| 72 | 3B | 480 | 10 |
| 73 | 5B | 500 | 10 |
| 74 | 11B | 480 | 12 |
| 75 | 23B | 500 | 9 |
| 76 | 25B | 500 | 15 |
| 77 | 35B | 490 | 15 |
| 78 | 38B | 520 | 15 |
| 79 | 41B | 500 | 20 |
| 80 | 60B | 580 | 18 |

Example 81

10 parts by weight of polyester resin (the same as that in Example 61), 10 parts by weight of 2,5-bis(4-diethylaminophenyl)-1,3,4-oxadiazole, 2 parts by weight of the disazo compound No. 1B and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 2. When this photosensitive material was subsequently subjected to the same measurement as in Example 61, the result was as follows:

Vpo=790 V, E½=5 lux.sec.

Examples 82 through 90

Varieties of photosensitive materials having a structure illustrated in FIG. 2 were prepared by applying the same procedure as in Example 81 save for employing the respective disazo compounds referred to by number in the following Table-9 in place of the disazo compound No. 1B used in Example 81. When these photosensitive materials were subsequently subjected to the same measurement of Vpo and E½ as in Example 61, the result was as shown in the following Table-9, respectively.

TABLE-9

| Example No. | Disazo compound No. | Vpo (volt) | E½ (lux.sec.) |
|---|---|---|---|
| 82 | 2B | 950 | 10 |
| 83 | 9B | 920 | 12 |
| 84 | 13B | 900 | 10 |
| 85 | 28B | 920 | 15 |
| 86 | 33B | 900 | 13 |
| 87 | 45B | 920 | 19 |
| 88 | 47B | 990 | 19 |
| 89 | 52B | 1000 | 20 |
| 90 | 66B | 950 | 25 |

Example 91

200 parts by weight of poly-N-vinyl carbazole, 33 parts by weight of 2,4,7-trinitro-9-fluorenone, 20 parts by weight of polyester resin (the same as that in Example 61) and 20 parts by weight of the disazo compound No. 1B as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13μ-thick photosensitive layer and a structure illustrated in FIG. 2. When this photosensitive material was subjected to the same measurement as in Example 61, the result was as follows:

Vpo=1,020 V, E½=3 lux.sec.

Examples 92 through 100

Varieties of photosensitive materials having a structure illustrated in FIG. 2 were prepared by applying the same procedure as in Example 91 save for employing the respective disazo compound referred to by number in the following Table-10 in place of the disazo compound No. 1B used in Example 91. When these photosensitive materials were subsequently subjected to the same measurement of Vpo and E½ as in Example 61, the result was as shown in the following Table-10, respectively.

TABLE 10

| Example No. | Disazo compound No. | Vpo (volt) | E1/2 (lux . sec.) |
|---|---|---|---|
| 92 | 9B | 1020 | 5 |
| 93 | 10B | 1000 | 3 |
| 94 | 17B | 1120 | 5 |
| 95 | 29B | 1100 | 5 |
| 96 | 40B | 980 | 8 |
| 97 | 42B | 1000 | 10 |
| 98 | 51B | 1100 | 12 |
| 99 | 63B | 1000 | 15 |
| 100 | 64B | 1100 | 20 |

Example 101

2 parts by weight of the disazo compound No. 1B and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co. Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 3. When the thus obtained photosensitive material was subjected to the same measurement as in Example 61, the result was as follows:

Vpo=900 V, E½=15 lux.sec.

Examples 102 through 110

Varieties of photosensitive materials having a structure illustrated in FIG. 3 were prepared by applying the same procedure as in Example 101 save for employing the respective disazo compounds referred to by number in the following Table-11 in place of the disazo compound No. 1B used in Example 101. When these photosensitive materials were subjected to the same measurement of Vpo and $E_{\frac{1}{2}}$ as in Example 61, the result was as shown in Table-11, respectively.

TABLE 11

| Example No. | Disazo compound No. | Vpo (volt) | E1/2 (lux . sec.) |
|---|---|---|---|
| 102 | 8B | 800 | 10 |
| 103 | 15B | 820 | 10 |
| 104 | 21B | 870 | 12 |
| 105 | 30B | 900 | 15 |
| 106 | 33B | 910 | 18 |
| 107 | 43B | 880 | 20 |
| 108 | 53B | 900 | 15 |
| 109 | 55B | 920 | 20 |
| 110 | 61B | 900 | 20 |

Example 111

2 parts by weight of the disazo compound No. 1B and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as that in Example 101) and 46 parts by weight of tetrahydrofuran together, and this dispersion was coated on the foregoing charge-carrier generating layer by means of a doctor blade and then dried at a temperature of 120° C. for 10 minutes to form a 10μ-thick charge-transfer medium layer, whereby there was obtained a laminate-type photosensitive material illustrated in FIG. 3. When the thus obtained photosensitive material was subjected to the same measurement of Vpo and $E_{\frac{1}{2}}$ as in Example 61 save for applying −6 KV corona discharge instead of +6 KV corona discharge, the result was as follows:

Vpo=1,020 V, $E_{\frac{1}{2}}$=10 lux.sec.

Examples 112 through 120

Varieties of photosensitive materials having the same structure as that of Example 111 were prepared by employing the respective disazo compound referred to by number in the following Table-12 in place of the disazo compound No. 1B used in Example 111. When these photosensitive materials were subjected to the same measurement of Vpo and $E_{\frac{1}{2}}$ as in Example 61, the result was as shown in Table-12, respectively.

TABLE 12

| Example No. | Disazo compound No. | Vpo (volt) | E1/2 (lux . sec.) |
|---|---|---|---|
| 112 | 6B | 1000 | 9 |
| 113 | 14B | 990 | 10 |
| 114 | 19B | 980 | 8 |
| 115 | 22B | 1000 | 12 |
| 116 | 27B | 1020 | 15 |
| 117 | 36B | 1030 | 10 |
| 118 | 44B | 1000 | 9 |
| 119 | 48B | 1100 | 20 |
| 120 | 53B | 1200 | 25 |

Example 121

1 part by weight of polyester resin (namely, Polyester Adhesive 49000, the manufacture of Du Pont Inc.), 1 part by weight of the disazo compound No. 1C and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure illustrated in FIG. 1.

Subsequently, after charging positive electricity on the photosensitive layer of this photosensitive material by applying +6 KV corona discharge for 20 seconds by means of a commercial electrostatic copying paper testing apparatus, the photosensitive material was left alone in the dark for 20 seconds, and the surface potential Vpo(volt) at that time was measured. Next, light was applied to the photosensitive layer by means of a tungsten lamp so as to attain the illumination of 20 luxes on the surface thereof, and the time (unit: second) required for reducing said surface potential Vpo to half was sought, whereby the amount of exposure $E_{\frac{1}{2}}$ (lux.-sec.) was obtained. The result was as follows:

Vpo=700 V, $E_{\frac{1}{2}}$=10 lux.sec.

Examples 122 through 130

Varieties of photosensitive materials were prepared by applying the same procedure as in Example 121 save for employing the respective disazo compounds referred to by number in the following Table-13 in place of the disazo compound No. 1C used in Example 121. When these photosensitive materials were subsequently subjected to the same measurement of Vpo and $E_{\frac{1}{2}}$ as in Example 121, the result was as shown in Table-13, respectively.

TABLE 13

| Example No. | Disazo compound No. | Vpo (volt) | E1/2 (lux . sec.) |
|---|---|---|---|
| 122 | 3C | 720 | 10 |
| 123 | 5C | 700 | 8 |
| 124 | 18C | 680 | 10 |
| 125 | 30C | 700 | 12 |
| 126 | 44C | 800 | 15 |
| 127 | 49C | 890 | 10 |
| 128 | 55C | 800 | 20 |
| 129 | 67C | 800 | 10 |
| 130 | 93C | 790 | 5 |

Example 131

10 parts by weight of polyester resin (the same as that in Example 121), 10 parts by weight of 2,4,7-trinitro-9-fluorenone, 2 parts by weight of disazo compound No. 1C and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 10μ-thick photosensitive layer and a structure illustrated in FIG. 2. Subsequently, measurement of Vpo and $E_{\frac{1}{2}}$ of this photosensitive material was conducted through the same procedure as in Example 121 save for applying −6 KV corona discharge instead of +6 KV corona discharge employed in Example 121. The result was as follows:

Vpo=430 V, E½=12 lux.sec.

Examples 132 through 140

Varieties of photosensitive materials having a structure illustrated in FIG. 2 were prepared by applying the same procedure as in Example 131 save for employing the respective disazo compounds referred to by number in the following Table-14 in place of the disazo compound No. 1C used in Example 131. When these photosensitive materials were subsequently subjected to the same measurement of Vpo and E½ as in Example 121, the result was as shown in Table-14, respectively.

TABLE 14

| Example No. | Disazo compound No. | Vpo (volt) | E1/2 (lux . sec.) |
|---|---|---|---|
| 132 | 3C | 450 | 12 |
| 133 | 5C | 480 | 13 |
| 134 | 12C | 490 | 12 |
| 135 | 25C | 520 | 15 |
| 136 | 27C | 450 | 10 |
| 137 | 48C | 440 | 11 |
| 138 | 69C | 450 | 10 |
| 139 | 71C | 440 | 10 |
| 140 | 110C | 440 | 20 |

Example 141

10 parts by weight of polyester resin (the same as that in Example 121), 10 parts by weight of 2,5-bis(4-diethylaminophenyl)-1,3,4-oxadiazole, 2 parts by weight of the disazo compound No. 1C and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 2. When this photosensitive material was subsequently subjected to the same measurement as in Example 121, the result was as follows:

Vpo=820 V, E½=8 lux.sec.

Examples 142 through 150

Varieties of photosensitive materials having a structure illustrated in FIG. 2 were prepared by applying the same procedure as in Example 141 save for employing the respective disazo compounds referred to by number in the following Table-15 in place of the disazo compound No. 1C used in Example 141. When these photosensitive materials were subsequently subjected to the same measurement of Vpo and E½ as in Example 121, the result was as shown in the following Table-15, respectively.

TABLE 15

| Example No. | Disazo compound No. | Vpo (volt) | E ½ (lux. sec.) |
|---|---|---|---|
| 142 | 17C | 800 | 5 |
| 143 | 27C | 800 | 9 |
| 144 | 56C | 790 | 35 |
| 145 | 62C | 800 | 30 |
| 146 | 67C | 820 | 10 |
| 147 | 71C | 820 | 10 |
| 148 | 83C | 800 | 8 |
| 149 | 101C | 810 | 10 |
| 150 | 126C | 830 | 20 |

Example 151

200 parts by weight of poly-N-vinyl carbazole, 33 parts by weight of 2,4,7-trinitro-9-fluorenone, 20 parts by weight of polyester resin (the same as that in Example 121) and 20 parts by weight of the disazo compound No. 1C as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13μ-thick photosensitive layer and a structure illustrated in FIG. 2. When this photosensitive material was subjected to the same measurement as in Example 121, the result was as follows:

Vpo=1,000 V, E½=5 lux.sec.

Examples 152 through 160

Varieties of photosensitive materials having a structure illustrated in FIG. 2 were prepared by applying the same procedure as in Example 151 save for employing the respective disazo compound referred to by number in the following Table-16 in place of the disazo compound No. 1C used in Example 151. When these photosensitive materials were subsequently subjected to the same measurement of Vpo and E½ as in Example 121, the result was as shown in the following Table-16, respectively.

TABLE 16

| Example No. | Disazo compound No. | Vpo (volt) | E ½ (lux. sec.) |
|---|---|---|---|
| 152 | 3C | 1100 | 5 |
| 153 | 5C | 1100 | 3 |
| 154 | 19C | 1000 | 8 |
| 155 | 55C | 900 | 15 |
| 156 | 67C | 980 | 5 |
| 157 | 91C | 1020 | 3 |
| 158 | 110C | 1040 | 8 |
| 159 | 123C | 1080 | 18 |
| 160 | 127C | 1200 | 25 |

Example 161

2 parts by weight of the disazo compound No. 1C and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co., Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 3. When the thus obtained photosensitive material was subjected to the same measurement as in Example 121, the result was as follows:

$V_{po} = 920$ V, $E_{\frac{1}{2}} = 15$ lux.sec.

Examples 162 through 170

Varieties of photosensitive materials having a structure illustrated in FIG. 3 were prepared by applying the same procedure as in Example 161 save for employing the respective disazo compounds referred to by number in the following Table-17 in place of the disazo compound No. 1C used in Example 161. When these photosensitive materials were subjected to the same measurement of $V_{po}$ and $E_{\frac{1}{2}}$ as in Example 121, the result was as shown in Table-17, respectively.

TABLE 17

| Example No. | Disazo compound No. | Vpo (volt) | E½ (lux. sec.) |
|---|---|---|---|
| 162 | 3C | 980 | 15 |
| 163 | 5C | 920 | 12 |
| 164 | 19C | 900 | 10 |
| 165 | 55C | 950 | 20 |
| 166 | 67C | 930 | 10 |
| 167 | 91C | 990 | 8 |
| 168 | 110C | 990 | 10 |
| 169 | 123C | 920 | 19 |
| 170 | 127C | 1000 | 30 |

Example 171

2 parts by weight of the disazo compound 1C and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as that in Example 151) and 46 parts by weight of tetrahydrofuran together, and this dispersion was coated on the foregoing charge-carrier generating layer by means of a doctor blade and then dried at a temperature of 120° C. for 10 minutes to form a 10μ-thick charge-transfer medium layer, whereby there was obtained a laminate-type photosensitive material illustrated in FIG. 3. When the thus obtained photosensitive material was subjected to the same measurement of $V_{po}$ and $E_{\frac{1}{2}}$ as in Example 121 save for applying −6 KV corona discharge instead of +6 KV corona discharge, the result was as follows:

$V_{po} = 990$ V, $E_{\frac{1}{2}} = 8$ lux.sec.

Examples 172 through 180

Varieties of photosensitive materials having the same structure as that of Example 171 were prepared by employing the respective disazo compound referred to by number in the following Table-18 in place of the disazo compound No. 1C used in Example 171. When these photosensitive materials were subjected to the same measurement of $V_{po}$ and $E_{\frac{1}{2}}$ as in Example 121, the result was as shown in Table-18, respectively.

TABLE 18

| Example No. | Disazo compound No. | Vpo (volt) | E½ (lux. sec.) |
|---|---|---|---|
| 172 | 3C | 900 | 10 |
| 173 | 5C | 890 | 10 |
| 174 | 19C | 910 | 12 |
| 175 | 55C | 910 | 25 |
| 176 | 67C | 900 | 12 |
| 177 | 91C | 880 | 18 |
| 178 | 110C | 870 | 15 |
| 179 | 123C | 890 | 20 |
| 180 | 127C | 900 | 35 |

Example 181

1 parts by weight of polyester resin (namely, Polyester Adhesive 49000, the manufacture of Du Pont Inc.), 1 part by weight of the disazo compound 1D and 26 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosensitive material having a 7μ-thick photosensitive layer and a structure illustrated in FIG. 1.

Subsequently, after charging positive electricity on the photosensitive layer of this photosensitive materials by applying +6 KV corona discharge for 20 seconds by means of a commercial electrostatic copying paper testing apparatus, the photosensitive material was left alone in the dark for 20 seconds, and the surface potential $V_{po}$(volt) at that time was measured. Next, light was applied to the photosensitive layer by means of a tungsten lamp so as to attain the illumination of 20 luxes on the surface thereof, and the time (unit: second) required for reducing said surface potential $V_{po}$ to half was sought, whereby the amount of exposure $E_{\frac{1}{2}}$ (lux.-sec.) was obtained. The result was as follows:

$V_{po} = 500$ V, $E_{\frac{1}{2}} = 15$ lux.sec.

Examples 182 through 190

Varieties of photosensitive materials were prepared by applying the same procedure as in Example 181 save for employing the respective disazo compounds referred to by number in the following Table-19 in place of the disazo compound No. 1D used in Example 181. When these photosensitive materials were subsequently subjected to the same measurement of $V_{po}$ and $E_{\frac{1}{2}}$ as in Example 181, the result was as shown in Table-19, respectively.

TABLE 19

| Example No. | Disazo compound No. | Vpo (volt) | E½ (lux. sec.) |
|---|---|---|---|
| 182 | 4D | 620 | 10 |
| 183 | 17D | 620 | 10 |
| 184 | 18D | 700 | 12 |
| 185 | 32D | 710 | 14 |
| 186 | 37D | 700 | 25 |
| 187 | 49D | 690 | 30 |
| 188 | 58D | 690 | 30 |
| 189 | 62D | 700 | 20 |
| 190 | 65D | 800 | 35 |

Example 191

10 parts by weight of polyester resin (the same as that in Example 181), 10 parts of weight of 2,4,7-trinitro-9-fluorenone, 2 parts by weight of disazo compound No. 1D and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes, whereby there was obtained a photosenitive material having a 10μ-thick photosensitive layer and a structure illustrated in FIG. 2. Subsequently, measurement of Vpo and E½ of this photosensitive material was conducted through the same procedure as in Example 181 save for applying −6 KV corona discharge instead of +6 KV corona discharge employed in Example 15. The result was as follows:

$Vpo = 500$ V, $E_{\frac{1}{2}} = 8$ lux.sec.

Examples 192 through 200

Varieties of photosensitive materials having a structure illustrated in FIG. 2 were prepared by applying the same procedure as in Example 191 save for employing the respective disazo compounds referred to by number in the following Table-20 in place of the disazo compound No. 1D used in Example 181. When these photosensitive materials were subsequently subjected to the same measurement of Vpo and E½ as in Example 181, the result was as shown in Table-20, respectively.

TABLE 20

| Example No. | Disazo compound No. | Vpo (volt) | E½ (lux. sec.) |
|---|---|---|---|
| 192 | 3D | 490 | 8 |
| 193 | 5D | 480 | 5 |
| 194 | 11D | 500 | 9 |
| 195 | 23D | 500 | 15 |
| 196 | 25D | 480 | 18 |
| 197 | 35D | 520 | 20 |
| 198 | 38D | 500 | 20 |
| 199 | 41D | 490 | 18 |
| 200 | 60D | 630 | 18 |

Example 201

10 parts by weight of polyester resin (the same as that in Example 181), 10 parts by weight of 2,5-bis(4-diethylaminophenyl)-1,3,4-oxadiazole, 2 parts by weight of the disazo compound No. 1D and 198 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 120° C. for 10 minutes, whereby there was prepared a photosensitive material having a 10μ-thick photosensitive layer and a structure illustrated in FIG. 2. When this photosensitive material was subsequently subjected to the same measurement as in Example 181, the result was as follows:

$Vpo = 800$ V, $E_{\frac{1}{2}} = 6$ lux.sec.

Examples 202 through 210

Varieties of photosensitive materials having a structure illustrated in FIG. 2 were prepared by applying the same procedure as in Example 201 save for employing the respective disazo compounds referred to by number in the following Table-21 in place of the disazo compound No. 1D used in Example 201. When these photosensitive materials were subsequently subjected to the same measurement of Vpo and E½ as in Example 181, the result was as shown in the following Table-21, respectively.

TABLE 21

| Example No. | Disazo compound No. | Vpo (volt) | E1/2 (lux . sec.) |
|---|---|---|---|
| 202 | 2D | 950 | 10 |
| 203 | 9D | 900 | 12 |
| 204 | 13D | 920 | 8 |
| 205 | 28D | 930 | 15 |
| 206 | 33D | 890 | 16 |
| 207 | 45D | 900 | 19 |
| 208 | 47D | 900 | 20 |
| 209 | 52D | 890 | 21 |
| 210 | 66D | 950 | 25 |

Example 211

200 parts by weight of poly-N-vinyl carbazole, 33 parts by weight of 2,4,7-trinitro-9-fluorenone, 20 parts by weight of polyester resin (the same as that in Example 181) and 20 parts by weight of the disazo compound No. 1D as added to 1780 parts by weight of tetrahydrofuran were pulverized and mixed together within a ball-mill, and the resulting dispersion was coated, by means of a doctor blade, on a polyester film deposited with aluminum through vacuum evaporation and was dried at a temperature of 100° C. for 10 minutes and at a temperature of 120° C. for 5 minutes in succession, whereby there was obtained a photosensitive material having a 13μ-thick photosensitive layer and a structure illustrated in FIG. 2. When this photosensitive material was subjected to the same measurement as in Example 181, the result was as follows:

$Vpo = 1,000$ V, $E_{\frac{1}{2}} = 3$ lux.sec.

Examples 212 through 220

Varieties of photosensitive materials having a structure illustrated in FIG. 2 were prepared by applying the same procedure as in Example 211 save for employing the respective disazo compounds referred to by number in the following Table-22 in place of the disazo compound No. 1D used in Example 211. When these photosensitive materials were subsequently subjected to the same measurement of Vpo and E½ as in Example 181, the result was as shown in the following Table-22, respectively.

TABLE-22

| Example No. | Sisazo compound No. | Vpo (volt) | $E_{\frac{1}{2}}$ (lux.sec.) |
|---|---|---|---|
| 212 | 9D | 1020 | 5 |
| 213 | 10D | 1000 | 3 |
| 214 | 17D | 1120 | 8 |
| 215 | 29D | 1000 | 6 |
| 216 | 40D | 995 | 10 |
| 217 | 42D | 1150 | 8 |
| 218 | 51D | 1200 | 12 |
| 219 | 63D | 1200 | 15 |
| 220 | 64D | 1210 | 15 |

Example 221

2 parts by weight of the disazo compound No. 1D and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,4,7-trinitro-9-fluorenone, 2 parts by weight of polycarbonate (namely, Panlite L, the manufacture of TEIJIN Co. Ltd.) and 46 parts by weight of tetrahydrofuran together, and this dispersion was coated on the foregoing charge-carrier generating layer by means of a doctor blade and then dried at a temperature of 100° C. for 10 minutes to form a 10μ-thick charge-transfer medium layer, whereby there was obtained a photosensitive material having a structure illustrated in FIG. 3. When the thus obtained photosensitive material was subjected to the same measurement as in Example 181, the result was as follows:

Vpo = 800 V, $E_{\frac{1}{2}}$ = 15 lux.sec.

Examples 222 through 230

Varieties of photosensitive materials having a structure illustrated in FIG. 3 were prepared by applying the same procedure as in Example 221 save for employing the respective disazo compounds referred to by number in the following Table-23 in place of the disazo compound No. 1D used in Example 221. When these photosensitive materials were subjected to the same measurement of Vpo and $E_{\frac{1}{2}}$ as in Example 181, the result was as shown in Table-23, respectively.

TABLE-23

| Example No. | Disazo compound No. | Vpo (volt) | E1/2 (lux . sec.) |
|---|---|---|---|
| 222 | 8D | 850 | 9 |
| 223 | 15D | 800 | 10 |
| 224 | 21D | 870 | 8 |
| 225 | 30D | 880 | 15 |
| 226 | 33D | 890 | 20 |
| 227 | 43D | 900 | 10 |
| 228 | 53D | 865 | 10 |
| 229 | 55D | 880 | 18 |
| 230 | 61D | 900 | 25 |

Example 231

2 parts by weight of the disazo compound No. 1D and 98 parts by weight of tetrahydrofuran were pulverized and mixed together within a ball-mill, and the resulting dispersion was coated, by means of a doctor blade, on a polyester film deposited with aluminum through vacuum evaporation and was subjected to natural drying, whereby there was formed a 1μ-thick charge-carrier generating layer. Meanwhile, another dispersion was prepared by mixing 2 parts by weight of 2,5-bis(4-diethylaminophenyl)-1,3,4-oxadiazole, 2 parts by weight of polycarbonate (the same as that in Example 221) and 46 parts by weight of tetrahydrofuran together, and this dispersion was coated on the foregoing charge-carrier generating layer by means of a doctor blade and then dried at a temperature of 120° C. for 10 minutes to form a 10μ-thick charge-transfer medium layer, whereby there was obtained a laminate-type photosensitive material illustrated in FIG. 3. When the thus obtained photosensitive material was subjected to the same measurement of Vpo and $E_{\frac{1}{2}}$ as in Example 181 save for applying −6 KV corona discharge instead of +6 KV corona discharge, the result was as follows:

Vpo = 1,000 V, $E_{\frac{1}{2}}$ = 8 lux.sec.

Examples 232 through 240

Varieties of photosensitive materials having the same structure as that of Example 231 were prepared by employing the respective disazo compound referred to by number in the following Table-24 in place of the disazo compound No. 1D used in Example 231. When these photosensitive materials were subjected to the same measurement of Vpo and $E_{\frac{1}{2}}$ as in Example 181, the result was as shown in Table-24, respectively.

TABLE-24

| Example No. | Disazo compound No. | Vpo (volt) | E1/2 (lux . sec.) |
|---|---|---|---|
| 232 | 6D | 1000 | 8 |
| 233 | 14D | 990 | 8 |
| 234 | 19D | 980 | 10 |
| 235 | 22D | 990 | 8 |
| 236 | 27D | 1000 | 10 |
| 237 | 36D | 990 | 15 |
| 238 | 44D | 1000 | 8 |
| 239 | 48D | 1020 | 19 |
| 240 | 53D | 1100 | 25 |

What is claimed is:

1. An electrophotographic material having a high sensitivity as well as a high flexibility, which comprises an electrically conductive support and a photosensitive layer formed thereon, said photosensitive layer consisting essentially of fine particles of disazo pigment selected from the group consisting of disazo pigments having the formulas I and III, formula I:

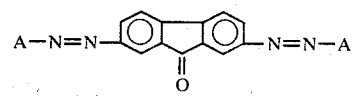

formula III:

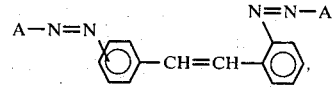

wherein A is selected from the group consisting of

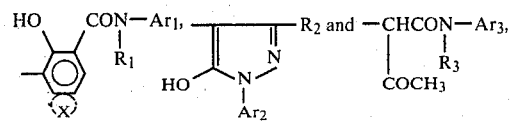

wherein $\overset{\frown}{x}$ is a fused ring selected from the group consisting of benzene ring, halobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and $-COOC_2H_5$; and a resinous binder.

2. An electrophotographic material according to claim 1 wherein the particle size of said disazo pigment is less than 5 microns, the amount of said disazo pigment is 30–70%, based on the weight of the photosensitive layer, and the thickness of the photosensitive layer is about 3 to 50 microns.

3. An electrophotographic material according to claim 1 in which A is

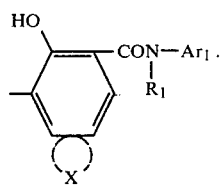

4. An electrophotographic material according to claim 1 in which A is

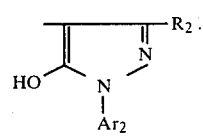

5. An electrophotographic material which comprises an electrically conductive support and a photosensitive layer formed thereon, said photosensitive layer consisting essentially of fine particles of disazo pigment selected from the group consisting of disazo pigments having the formulas I and III, formula I:

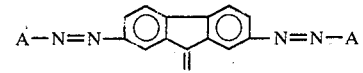

formula III:

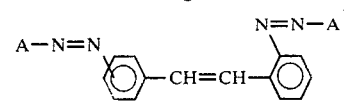

wherein A is selected from the group consisting of

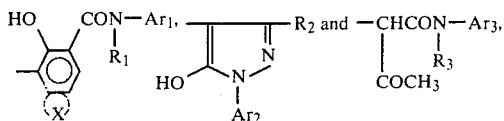

wherein $\overset{\frown}{x}$ is a fused ring selected from the group consisting of benzene ring, halobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and $-COOC_2H_5$; a charge-transfer substance and a resinous binder.

6. An electrophotographic material according to claim 5 wherein the particle size of said disazo pigment is less than 5 microns, the amount of said disazo pigment is 1–50% and the amount of said charge-transfer substance is 10–95%, based on the weight of the photosensitive layer, and the thickness of the photosensitive layer is about 3 to 50 microns.

7. An electrophotographic material according to claim 5 in which A is

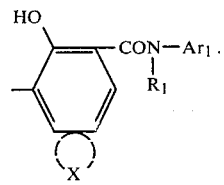

8. An electrophotograhic material according to claim 5 in which A is

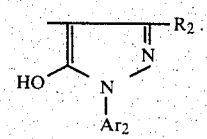

9. An electrophotographic material which comprises an electrically conductive support and a charge carrier-generating layer formed thereon, said charge carrier-generating layer consisting essentially of fine particles of disazo pigment selected from the group consisting of disazo pigments having the formulas I and III, formula I:

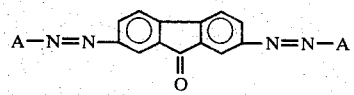

formula III:

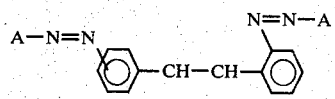

wherein A is selected from the group consisting of

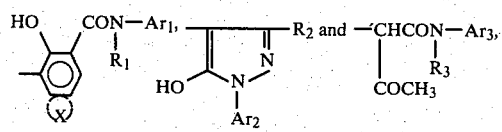

wherein $\overline{X}$ is a fused ring selected from the group consisting of benzene ring, halobenzene ring, naphthalene ring, indole ring, cabazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and $-COOC_2H_5$; and a charge-transfer layer on said charge-carrier generating layer, said charge-transfer layer consisting essentially of a charge-transfer substance and a resinous binder.

10. An electrophotographic material according to claim 9 wherein the particle size of said disazo pigment is less than 5 microns, the amount of said charge-transfer substance is 10–95%, based on the weight of said charge-transfer layer, the thickness of said charge carrier-generating layer is less than 5 microns and the thickness of said charge-transfer layer is about 3 to 50 microns.

11. An electrophotograhic material according to claim 10 in which A is

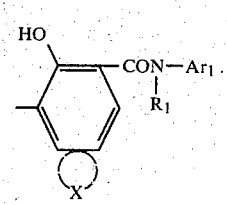

12. An electrophotographic material according to claim 10 in which A is

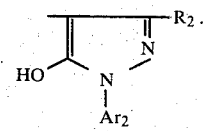

13. An electrophotographic material which comprises an electrically conductive support, a charge-transfer layer on said support, said charge-transfer layer consisting essentially of a charge-transfer substance and a resinous binder, and a charge carrier-generating layer on said charge-transfer layer, said charge carrier-generating layer consisting essentially of fine particles of disazo pigment selected from the group consisting of disazo pigments having the formulas I and III, formula I:

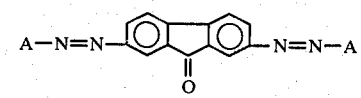

formula III:

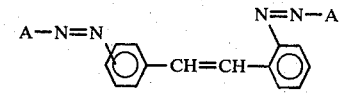

wherein A is selected from the group consisting of

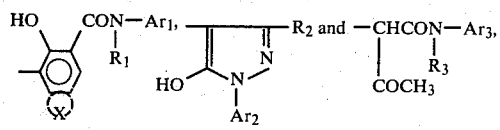

wherein $\overline{X}$ is a fused ring selected from the group consisting of benzene ring, halobenzene ring, naphthalene ring, indole ring, carbazole ring and benzofuran ring; $Ar_1$ is a member selected from the group consisting of phenyl, methylphenyl, methoxyphenyl, chlorophenyl, nitrophenyl, ethoxyphenyl, methylchlorophenyl, dimethylphenyl, methoxychlorophenyl, methoxybromophenyl, methoxymethylphenyl, dimethoxyphenyl, dimethoxychlorophenyl, dimethylaminophenyl, cyanophenyl, carboxyphenyl, benzenesulfonic acid sodium salt, tert-butoxyphenyl, naphthyl, methoxydibenzofuryl and carbazolyl; each of $Ar_2$ and $Ar_3$ is a member selected from the group consisting of phenyl, naphthyl, methoxyphenyl, methylphenyl, acetylaminophenyl, dimethylaminophenyl, cyanophenyl, nitrophenyl, dinitrophenyl, chlorophenyl, trichlorobenzenesulfonic acid, benzenesulfonic acid and benzenesulfonamide; each of $R_1$ and $R_3$ is a member selected from the group consisting of hydrogen, methyl, ethyl, phenyl and chlorophenyl; and $R_2$ is a member selected from the group consisting of methyl, carboxyl and $-COOC_2H_5$.

14. An electrophotograhic material according to claim 13 wherein the particle size of said disazo pigment is less than 5 microns, and the amount of said charge-transfer substance is 10–95% by weight, based on the weight of said charge-transfer layer, the thickness of said charge carrier-generating layer is less than 5 microns and the thickness of said charge-transfer layer is about 3 to 50 microns.

15. An electrophotographic material according to claim 13 in which A is

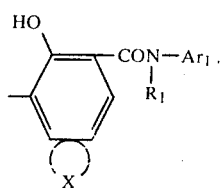

16. An electrophotographic material according to claim 13 in which A is

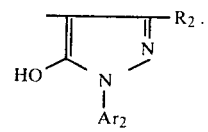

* * * * *